United States Patent
Chakraborty et al.

(10) Patent No.: US 8,768,264 B2
(45) Date of Patent: Jul. 1, 2014

(54) METHOD AND SYSTEM FOR REDUCING FEEDBACK INFORMATION IN MULTICARRIER-BASED COMMUNICATION SYSTEMS BASED ON TEMPORAL CORRELATION

(75) Inventors: Kaushik Chakraborty, San Diego, CA (US); Soumya Das, San Diego, CA (US); Ozgur Dural, San Diego, CA (US); Krishnan Rajamani, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 12/716,064

(22) Filed: Mar. 2, 2010

(65) Prior Publication Data

US 2010/0227561 A1 Sep. 9, 2010

Related U.S. Application Data

(60) Provisional application No. 61/157,144, filed on Mar. 3, 2009.

(51) Int. Cl.
*H04B 7/00* (2006.01)
*H04L 5/00* (2006.01)
*H04L 25/02* (2006.01)
*H04W 72/04* (2009.01)
*H04L 25/03* (2006.01)

(52) U.S. Cl.
CPC ......... *H04W 72/0406* (2013.01); *H04L 5/0094* (2013.01); *H04L 5/0007* (2013.01); *H04L 2025/03802* (2013.01); *H04L 5/0085* (2013.01); *H04L 5/006* (2013.01); *H04L 25/0202* (2013.01); *H04L 5/0046* (2013.01); *H04L 25/0222* (2013.01); *H04L 5/0039* (2013.01); *H04L 5/0053* (2013.01)
USPC ....... 455/69; 455/67.11; 455/67.13; 455/450; 455/452; 455/101; 455/513; 455/436; 455/452.2; 455/466; 455/561; 370/479; 370/320; 370/329; 370/252; 375/267; 375/260; 375/225; 375/227; 375/221

(58) Field of Classification Search
USPC ............ 455/67.11, 67.13, 69, 450, 452, 63.1, 455/513, 436, 452.1, 101, 452.2, 466, 561; 370/479, 329, 320, 345, 252, 203, 210, 370/227, 468; 375/267, 260, 225, 227, 221
See application file for complete search history.

(56) References Cited

U.S. PATENT DOCUMENTS 5,940,439 A * 8/1999 Kleider et al. ................ 375/225
6,108,374 A * 8/2000 Balachandran et al. ...... 375/227

(Continued)

FOREIGN PATENT DOCUMENTS

EP 1806893 A2 7/2007
EP 1816758 A2 8/2007

(Continued)

OTHER PUBLICATIONS

Caire G, et al., "Feedback schemes for multiuser MIMO-OFDM downlink" Information Theory and Applications Workshop, 2008, IEEE, Piscataway, NJ, USA, Jan. 27, 2008, pp. 33-40, XP031307631.

(Continued)

*Primary Examiner* — Ganiyu A Hanidu

(57) ABSTRACT

Systems and methods for decreasing the amount of information sent on a feedback channel are disclosed. Spectral binning and/or a Markov state model may be used to reduce the amount of information sent on the feedback channel.

56 Claims, 12 Drawing Sheets

(56) References Cited

U.S. PATENT DOCUMENTS

| | | | | |
|---|---|---|---|---|
| 6,131,016 | A * | 10/2000 | Greenstein et al. | 455/69 |
| 6,154,489 | A * | 11/2000 | Kleider et al. | 375/221 |
| 7,457,588 | B2 * | 11/2008 | Love et al. | 455/67.11 |
| 7,492,699 | B2 | 2/2009 | Cho | |
| 7,903,538 | B2 | 3/2011 | Jacobsen et al. | |
| 7,953,170 | B2 * | 5/2011 | Currivan et al. | 375/260 |
| 8,041,308 | B2 * | 10/2011 | Yun et al. | 455/69 |
| 2002/0191703 | A1 * | 12/2002 | Ling et al. | 375/267 |
| 2004/0106412 | A1 | 6/2004 | Laroia et al. | |
| 2004/0109424 | A1 | 6/2004 | Chheda | |
| 2004/0136399 | A1 * | 7/2004 | Roberts | 370/468 |
| 2005/0157670 | A1 | 7/2005 | Tang et al. | |
| 2005/0213690 | A1 | 9/2005 | Lauer et al. | |
| 2005/0287978 | A1 | 12/2005 | Maltsev et al. | |
| 2006/0072567 | A1 | 4/2006 | Casaccia et al. | |
| 2006/0274712 | A1 | 12/2006 | Malladi et al. | |
| 2007/0237167 | A1 | 10/2007 | Kaneko et al. | |
| 2007/0243839 | A1 | 10/2007 | Kostic | |
| 2007/0264932 | A1 | 11/2007 | Suh et al. | |
| 2008/0009302 | A1 | 1/2008 | Cho et al. | |
| 2008/0152028 | A1 | 6/2008 | Futaki et al. | |
| 2008/0181160 | A1 | 7/2008 | Dillon | |
| 2009/0060064 | A1 | 3/2009 | Futaki et al. | |
| 2010/0226269 | A1 | 9/2010 | Chakraborty et al. | |
| 2010/0226452 | A1 | 9/2010 | Chakraborty et al. | |

FOREIGN PATENT DOCUMENTS

| | | |
|---|---|---|
| GB | 2386519 A | 9/2003 |
| JP | 2003169036 A | 6/2003 |
| JP | 2005502223 A | 1/2005 |
| JP | 2007043697 A | 2/2007 |
| JP | 2008539667 A | 11/2008 |
| WO | WO-0249305 A2 | 6/2002 |
| WO | WO02078211 | 10/2002 |
| WO | 2006049123 A1 | 5/2006 |
| WO | 2006107037 A1 | 10/2006 |
| WO | 2006116102 A2 | 11/2006 |
| WO | WO2007136212 A2 | 11/2007 |
| WO | WO2008054099 A1 | 5/2008 |

OTHER PUBLICATIONS

Ekpenyong A E, et al., "Feedback Constraints for Adaptive Transmission" IEEE Signal Processing Magazine, IEEE Service Center, Piscataway, NJ, US, vol. 24, No. 3, May 1, 2007, pp. 69-78, XP011184724.

International Search Report—PCT/US2010/026090—International Search Authority, European Patent Office, Feb. 17, 2011.

International Search Report and Written Opinion—PCT/US2010/026114, International Search Authority—European Patent Office—Feb. 17, 2011.

Myeon-Gyun Cho et al: "A Joint Feedback 25,32, Reduction Scheme Using Delta Modulation 39,46 for Dynamic Channel Allocation in OFDMA Systems" IEEE International Symposium on Personal, Indoor and Mobile Radio Communications, vol. 4, Sep. 11, 2005, pp. 2747-2750, XP010928190.

Chen, et al: "The Capacity of Finite-State Markov Channels with Feedback", IEEE Transactions on Information Theory, IEEE, US, vol. 51, No. 3, Mar. 1, 2005, pp. 780-798, XP011127412, ISSN: 0018-9448, DOI:10.1109/TIT.2004.842697.

Harish Viswanathan: "Capacity of Markov Channels with Receiver CSI and Delayed Feedback", IEEE Transactions on Information Theory, IEEE, US, vol. 45, No. 2, Mar. 1, 1999, XP011027310, ISSN: 0018-9448, pp. 761-771.

International Search Report and Written Opinion—PCT/US2010/026105—ISA/EPO—May 27, 2011.

Taiwan Search Report—TW099106213—TIPO—Apr. 2, 2013.

\* cited by examiner

| Rate (Mbps) | Bits | Rate (Mbps) | Bits |
|---|---|---|---|
| 53.3 | 000 | 200 | 100 |
| 80 | 001 | 320 | 101 |
| 106.7 | 010 | 400 | 110 |
| 160 | 011 | 480 | 111 |

METHOD AND SYSTEM FOR REDUCING FEEDBACK INFORMATION IN MULTICARRIER-BASED COMMUNICATION SYSTEMS BASED ON TEMPORAL CORRELATION

RELATED APPLICATIONS

The present Application for Patent claims priority to U.S. Provisional Application No. 61/157,144 entitled "METHOD AND SYSTEM FOR REDUCING FEEDBACK INFORMATION IN COMMUNICATION SYSTEMS", filed Mar. 3, 2009, which is hereby expressly incorporated by reference in its entirety. This application has related subject matter to, and incorporates by reference in its entirety, U.S. patent application Ser. No. 12/716,032 entitled "METHOD AND SYSTEM FOR REDUCING FEEDBACK INFORMATION IN MULTICARRIER-BASED COMMUNICATION SYSTEMS BASED ON FREQUENCY GROUPING", filed simultaneously with this application. This application also has related subject matter to, and incorporates by reference in its entirety, U.S. patent application Ser. No. 12/716,104 entitled "METHOD AND SYSTEM FOR REDUCING FEEDBACK INFORMATION IN MULTICARRIER-BASED COMMUNICATION SYSTEMS BASED ON TIERS", filed simultaneously with this application.

BACKGROUND

1. Field

The Application generally relates to communication networks and communication systems, including wideband and ultra-wideband communication systems. In particular, the Application relates to systems and methods for reducing the amount of data traffic on a feedback channel between a receiver and a transmitter.

2. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiplexing (OFDM) systems. Many forms of wireless communication systems use a feedback channel to improve the performance of the system. As data is sent between a transmitter and a receiver, the conditions of the communication channel being used may change. For example, as the receiver moves farther away from the transmitter, the communication channel conditions may degrade. The communication channel may also comprise a plurality of sub-carriers. Generally, the feedback channel is used by the receiver to transmit information about these changes in channel conditions to the transmitter. The information transmitted by the receiver on the feedback channel is often referred to as channel state information (CSI). In one embodiment, CSI may comprise an estimate or information about channel conditions for a certain channel. In another embodiment, CSI may comprise at least one of carrier-to-noise ratio (CNR), signal-to-noise ratio (SNR), received signal strength indicator (RSSI), signal-to-interference-and-noise-ratio (SINR), a signal strength, a noise level, and a data rate. It may also be referred to as channel quality indicator (CQI).

Generally, the CSI is sent from the receiver to the transmitter and may consume significant amounts of signaling resources. The CSI may provide, to the transmitter, data indicative of channel conditions obtained by the receiver. In one embodiment, the transmitter uses the CSI to control certain transmitter parameters including but not limited to, transmit signal power, data rate, or modulation and coding scheme. The CSI may be sent using CSI packets (e.g., packets sent from the receiver to the transmitter, which contain CSI). A plurality of CSI packets may be sent to the transmitter for a single feedback updates (e.g., an update that provides CSI for channel). In multicarrier-based wideband (WB) and ultra-wideband systems (UWB), e.g., OFDM-based systems, the feedback channel may be used to provide information for the plurality of subcarriers (e.g., tones). The feedback channel is responsible for providing CSI for the individual subcarriers on a timely basis, so that the transmitter may act on the available information. For example, if a transmitter receives CSI indicating that channel conditions have degraded, the transmitter may decide to transmit at a slower data rate. Thus, it is desirable to preserve signaling resources by reducing the amount of data traffic transmitted over feedback channels.

SUMMARY

In one embodiment, a wireless communication apparatus operable in a communication system is provided. The wireless communication apparatus comprises a channel estimator module configured to determine a variation in channel condition of at least one carrier frequency in a plurality of carrier frequencies designated for communicating the information. The variation is indicative of a channel condition for the at least one carrier frequency relative to at least one of a prior channel condition and a reference channel. The apparatus further comprises a communication module configured to communicate from a receiver to a transmitter data indicative of the variation in channel condition for the at least one carrier frequency if the variation in channel condition satisfies a first criterion.

In another embodiment, a wireless communication apparatus operable in a communication system is provided. The wireless communication apparatus comprises means for determining a variation in channel condition of at least one carrier frequency in a plurality of carrier frequencies designated for communicating the information. The variation is indicative of a channel condition for the at least one carrier frequency relative to at least one of a prior channel condition and a reference channel. The apparatus further comprises means for communicating from a receiver to a transmitter data indicative of the variation in channel condition for the at least one carrier frequency if the variation in channel condition satisfies a first criterion.

In yet another embodiment, a method of communicating in a communication system is provided. The method comprises determining a variation in channel condition of at least one carrier frequency in a plurality of carrier frequencies designated for communicating the information. The variation is indicative of a channel condition for the at least one carrier frequency relative to at least one of a prior channel condition and a reference channel. The method further comprises communicating from a receiver to a transmitter data indicative of the variation in channel condition for the at least one carrier frequency if the variation in channel condition satisfies a first criterion.

In a further embodiment, a computer program product comprising a computer-readable medium is provided. The medium comprises code for causing a computer to determine a variation in channel condition of at least one carrier frequency in a plurality of carrier frequencies designated for communicating the information. The variation is indicative of a channel condition for the at least one carrier frequency relative to at least one of a prior channel condition and a reference channel. The medium further comprises code for causing a computer to communicate from a receiver to a transmitter data indicative of the variation in channel condition for the at least one carrier frequency if the variation in channel condition satisfies a first criterion.

DETAILED DESCRIPTION

Figure 1:
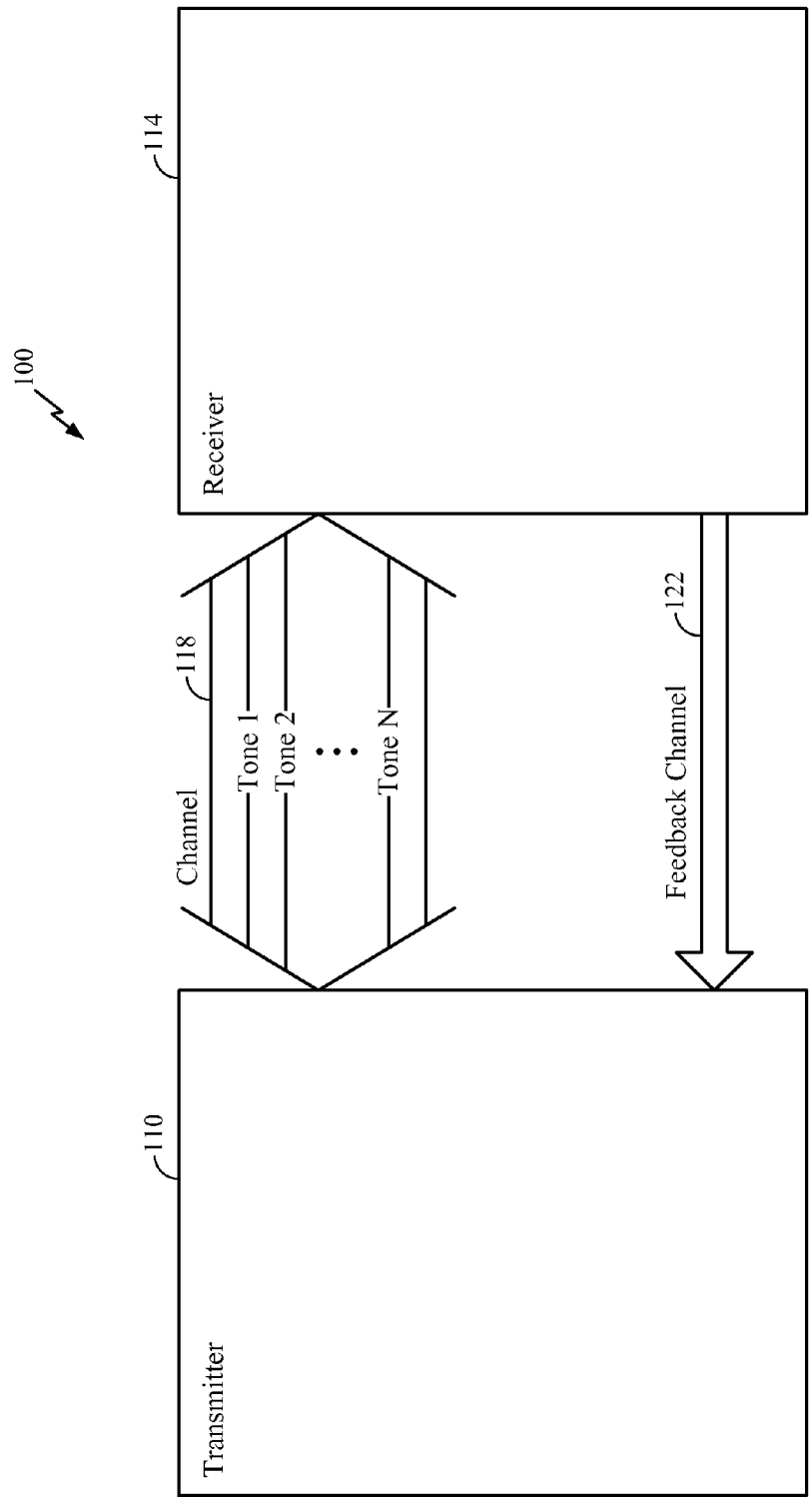
FIG. 1 is a block diagram illustrating a transmitter and a receiver in an exemplary wideband or ultrawideband wireless communication system.

In communication systems, channel conditions may be estimated via pilot tones at the receiver using techniques like least square (LS) estimation in both time domain and frequency domain. A pilot tone generally refers to a signal (e.g., a single frequency), which may be transmitted over a communications system for supervisory, control, equalization, continuity, synchronization, or reference purposes. Adaptive transmission schemes like power and rate control and other coding/modulation techniques may improve the communication performance of communication systems, provided that the transmitter has accurate estimates of the current channel conditions. As noted above, this channel state information (CSI) is typically conveyed from the receiver to the transmitter via a feedback channel which supports this control information with low latency, a reasonably high degree of accuracy, and low overhead.

For information about generating CQI measurement reports, reference is made to U.S. Pat. No. 7,457,588 (hereinafter '588) which is hereby incorporated by reference in its entirety.

Examples are provided to describe the operation of a feedback channel and the magnitude of information transmitted over the feedback channel. Although the following disclosure is describing applicability of the embodiments to UWB systems, one of ordinary skill in the art understands that certain embodiments are applicable to any communication system using a feedback channel. Some existing UWB system designs are based on the multi-band orthogonal frequency division multiplexing (MB-OFDM) system specified in the ECMA-368 standard. Certain embodiments of the invention may be described with reference to OFDM wireless communication systems. However, one of skill in the art will understand that the embodiments described herein may be applicable to any slowly time-varying wideband communication channel. Some embodiments may also be applicable to faster time-varying wideband communication channels.

As described below, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor, such as an application specific integrated circuit (ASIC). Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

FIG. 1 is a block diagram illustrating a transmitter 110 and a receiver 114 in an exemplary wideband or ultrawideband wireless communication system 100. The communication system 100 may be used to transmit and/or receive data between the transmitter 110 and the receiver 114 via a channel 118. The data may comprise voice, video, and multimedia data. The communication system 100 may comprise any type of communication system including, but not limited to, a code division multiple access (CDMA) system, a global system for mobile communication system (GSM), a wideband code division multiple access (WCDMA), and an OFDM system. The system 100 shown in FIG. 1 comprises an OFDM system. As shown in FIG. 1, the transmitter 110 is configured to transmit data to the receiver 114 via the channel 118. The receiver 114 is also configured to transmit data to the transmitter 110 via the channel 118. The channel 118 comprises multiple tones: Tone 1, Tone 2, up to Tone N. In one embodiment, system 100 effectively partitions the overall system bandwidth into any number of orthogonal tones, such as Tones 1 to N (e.g., as in an OFDM system). In one embodiment, each of Tones 1 to N may be associated with a respective subcarrier upon which data may be transmitted. In another embodiment, each of Tones 1 through N may be independent subcarriers. In yet another embodiment, each of the Tones 1 through 1 may not be independent subcarriers. Each of Tones 1 to N may be viewed as an independent transmission channel that may be used to transmit data between the transmitter 110 and the receiver 114. In one embodiment, the channel 118 may comprise N number of tones. The N number of tones may be any number. For example, N may be 100, such that the channel 118 comprises 100 tones. In another example, N may be 22 such that the channel 118 comprises 22 tones.

In the communication system 100, a substantially accurate estimate of the conditions of the wireless channel between the transmitter 110 and the receiver 114 is desirable in order to effectively transmit data on the available tones. For example, the channel conditions on Tone 1 may improve, while the channel conditions on Tone 2 may deteriorate. Thus, it may be desirable for the transmitter 110 to decrease the signal power for Tone 1, and increase the signal power for Tone 2. The receiver 114 may transmit CSI pertaining to the channel conditions of at least one of the tones, to the transmitter 110, using the feedback channel 122. For example, the receiver 114 may use the feedback channel 122 to transmit CSI to the transmitter 110 indicating an improvement in channel conditions for Tone 1 and a deterioration in channel conditions for Tone 2. The transmitter 110 may use the CSI received from the receiver 114, on the feedback channel 122, to reallocate or change the resources (e.g., transmit power, data rate, etc.) for the Tones 1 to N in the channel 118.

Figure 2:
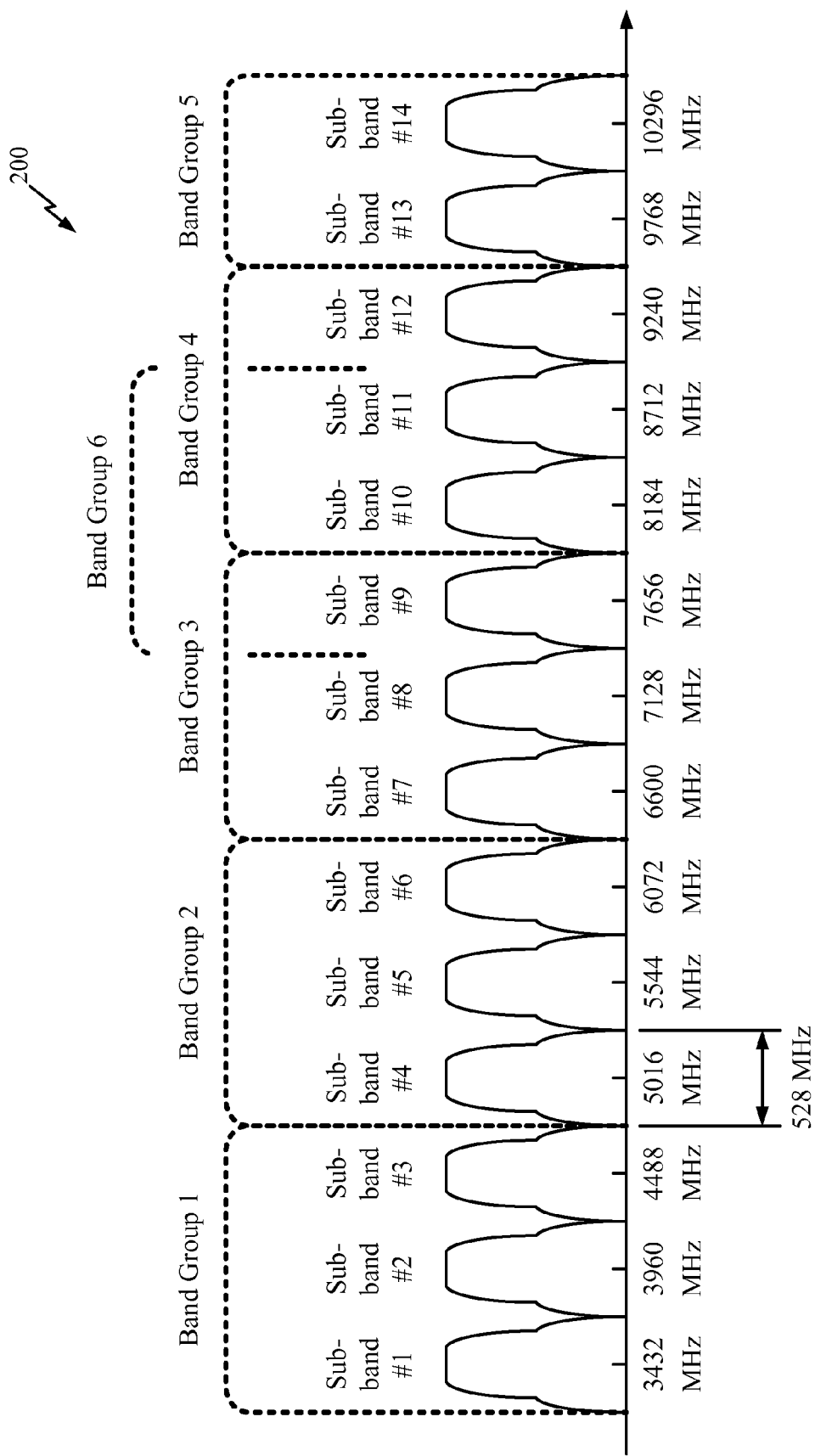
FIG. 2 is a diagram illustrating an exemplary spectrum allocation of the wireless communication system of FIG. 1.

FIG. 2 is a diagram illustrating an exemplary spectrum allocation 200 of the communication system 100 of FIG. 1. In one embodiment, the exemplary spectrum allocation 200 may be a spectrum allocation for a multi-band OFDM system (e.g., a system specified by the ECMA-386 standard). Spectrum allocation 200 is merely an exemplary allocation, and other spectrum allocations (e.g., frequencies and/or divisions of frequencies) may be used by other embodiments. The spectrum allocation 200 shows the different possible frequencies for the Tones 1 to N in the channel 118 of the communication system 100. The spectral range of spectrum allocation 200 ranges within 3.1 through 10.6 GHz. This spectral range of spectrum allocation 200 is subdivided into 14 contiguous sub-bands, Sub-bands 1 through 14. Each of the 14 sub-bands has a bandwidth 528 MHz. Each of the sub-bands contains 128 tones (e.g., at least some of Tones 1 through Tone N of FIG. 1), with a spacing of 4.125 MHz between each of the tones. The 14 sub-bands are grouped into 6 band groups, Band Groups 1 through 6. Band Groups 1 through 4 and 6 each have 3 sub-bands e.g., Band Group 1 has Sub-band 1, Sub-band 2, and Sub-band 3. Band Group 5 has 2 sub-bands: Sub-band 13 and Sub-band 14.

Referring to FIG. 1, the channel 118 may comprise any number of tones from any of the 14 sub-bands. For example, Tones 1 and 2 may be from Sub-band #1, but Tone N may be from Sub-band #3. In another example, Tone 1, Tone 2 up to Tone N may all be from Sub-band #8.

The coherence bandwidth (e.g., the range of tones which may experience similar channel conditions) of the communication system 100 may span several adjacent tones within or across the sub-bands shown in FIG. 2 (e.g., within Sub-Band #1 or across Sub-band #1 and Sub-band #2). Referring to FIG. 2, the coherence bandwidth of the communication system 100, according to one embodiment, is computed for different channel models CM1 through CM4. The channel models CM1 through CM4 are exemplary scenarios which the channel 118 may experience. The channel models CM1 through CM4 are described in J. R. Forester et al., *A Channel Model for Ultra Wideband Indoor Communicatin*, INTERNATIONAL SYMPOSIUM ON WIRELESS PERSONAL MULTIMEDIA COMMUNICATION (October 2003), which is hereby incorporated by reference in its entirety. For example, CM1 is a scenario where the distance between the transmitter 110 and the receiver 114 is less than 4 meters. In another example, CM3 is a scenario in which the distance between the transmitter 110 and the receiver 114 is four to ten meters. The coherence bandwidth may be 53.6, 28.9, 20.6 and 12.4 MHz in channel models CM1, CM2, CM3 and CM4, respectively. This may be calculated using a normalized cross-correlation of channel coefficients (e.g., real and/or complex numbers that indicate how the channel conditions affect the received signal at the receiver 114) across adjacent tones as a statistical parameter to determine coherence bandwidth. For example, a channel coefficient may represent the amplitude of a fade (e.g., degradation in signal strength) of a channel. The received signal amplitude may be obtained by multiplying a transmitted signal amplitude by the channel coefficient. The channel 118 may be represented in terms of multiple channel coefficients, where each channel coefficient is associated with one of the Tones 1 through N. Since each tone occupies a nominal bandwidth of 4.125 MHz, up to 13, 7, 5 and 3 adjacent tones are correlated in channel models CM1, CM2, CM3 and CM4, respectively. More discussion of the channel models CM1 through CM4 may be found in Q. Zou et al., *Performance Analysis of Multiband OFDM UWB Communications with Application to Range Improvement*, 56 IEEE TRANSACTIONS ON VEHICULAR TECHNOLOGY, 3864, 3864-3878, November 2007), which is hereby incorporated by reference in its entirety.

This indicates that the channel 118 may be correlated in both temporal and spectral dimensions. There may also be other sources of correlation, including but not limited to:
  (i) correlation between forward and reverse links in a Time Division Duplexing (TDD) communication mode under quasi-static channel conditions.
  (ii) spatial correlation if multiple antennas are deployed
  (iii) multiuser correlation if multiple users cooperatively share local channel state information to construct a distributed global channel state matrix As shown in FIG. 2, tones in the communication system 100 may be categorized into Sub-bands 1 through 14. The Sub-bands 1 through 14 may each contain tones which are adjacent to each other. In one embodiment, all of the Tones 1 through N in the communication system 100 may belong to only one of the 14 Sub-bands. In another embodiment, the Tones 1 through N may be spread over multiple Sub-bands. For example, the Tones 1 through N may be spread over 3 Sub-bands. In another embodiment, the Tones 1 through N may be spread over any arbitrary set of Sub-bands. Several adjacent tones in the communication system 100 may experience nearly identical channel conditions. Since the dynamic transmission schemes adapt to the variations of the CSI that are provided to the transmitter 110, it may be desirable for the adaptive scheme to assign the same resources (e.g., signal power and/or data rates) to adjacent tones. This correlation across tones may be gainfully exploited to compress the CSI feedback. As discussed above, spectrum allocation 200 is merely an exemplary allocation and the embodiments described herein may be applicable to any spectrum allocation.

Figure 3:
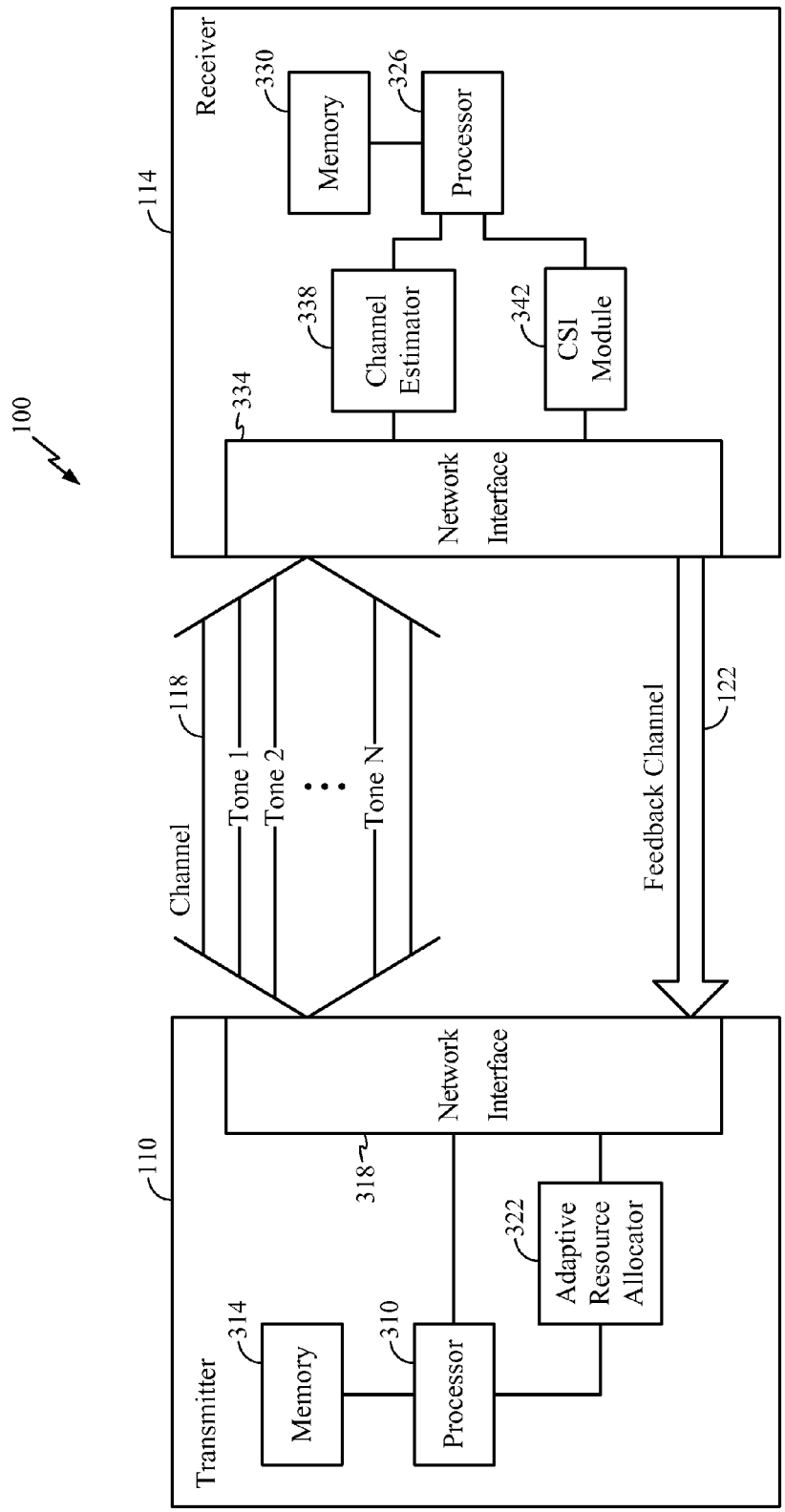
FIG. 3 is a block diagram illustrating exemplary components in the wireless communication system of FIG. 1.

FIG. 3 is a block diagram illustrating exemplary components of the transmitter 110 and the receiver 114 in the communication system 100 of FIG. 1. The transmitter 110 comprises a processor 310, a memory 314, a network interface 318 and an adaptive resource allocator 322. The memory 314 is coupled to the processor 310. The processor 310 is also coupled to the network interface 318 and the adaptive resource allocator 322. The adaptive resource allocator 322 is also coupled to the network interface 318.

The adaptive resource allocator 322 of the transmitter 110 is configured to adaptively allocate resources (e.g., increase/decrease signal power or data rates in response to CSI) for the channel 118. In one embodiment, the transmitter 110 may allocate resources each time new CSI is received. In another embodiment, the transmitter 110 may allocate resources only after a certain amount of CSI is received (e.g., after 3 CSI packets are received from the receiver 114 or after a predetermined period of time is passed). The adaptive resource allocator 322 may process the CSI itself, or it may use the processor 310 to process the CSI. The adaptive resource allocator 322 may then determine how to allocate resources to the tones in the channel 118, based on, at least in part, the CSI received on the feedback channel 122 from the receiver 114. For example, the resource allocator 322 may adjust the signal power for each of Tones 1 to Tone N as shown in FIG. 1. If channel conditions change for any of the tones, the resource allocator 322 may adjust the signal power for the tones based on, at least in part, the channel conditions for the tones. For example, the adaptive resource allocator 322 may increase signal power for Tone 1 and decrease the signal power for Tone 2, based on, at least in part, the CSI received from the feedback channel 122.

The receiver 114 comprises a processor 326, a memory 330, a network interface 334, a channel estimator 338 and a CSI module 342. The memory 330 is coupled to a processor 326. The processor is also coupled to the channel estimator 338, the CSI module 342, and the network interface 334. The channel estimator 338 is coupled to the CSI module 342 and both the channel estimator 338 and the CSI module 342 are coupled to the network interface 334.

The channel estimator 338 of the receiver 114 is configured to determine and/or estimate channel characteristics (e.g., noise level, signal strength, SNR, RSSI, etc.) of at least one of the tones in the channel 118. The channel estimator 338 may use the processor 336 when determining and/or estimating the channel characteristics. The receiver 114 further comprises a channel state information (CSI) module 342 configured to calculate or determine CSI about the channel. This CSI is sent by the receiver 114 over the feedback channel 122 to the transmitter 110. The CSI generated by the CSI module 342 is based on, at least in part, the channel characteristics generated by the channel estimator 338. The CSI module 342 may use the processor 336 to generate the CSI or it may generate the CSI itself.

As shown in FIG. 3, the channel 118 may comprise multiple subcarriers or tones, such as Tones 1 to N. Data transmitted over the channel 118 may be transmitted using any combination of the tones. The channel conditions of the tones may vary over time. The time-varying channel conditions are estimated at the receiver 114 for signal detection via the channel estimator 338. The feedback channel 122 from the receiver 114 to the transmitter 110 periodically provides current estimates of CSI to enable adaptive resource allocation strategies at the transmitter 118. For simplicity while describing certain embodiments, it is desirable for the feedback channel 122 to be substantially noise-free. This means that the CSI is noiselessly communicated from the receiver 114 to the transmitter 110. But in other embodiments, the feedback channel 122 may experience noise. One of skill in the art understands that noise compensation techniques may be used in conjunction with the feedback channel 122.

The processors 310 and 326 may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. The memories 314 and 330 may comprise a hard disk, RAM, ROM, a memory card, flash memory, a CD-ROM, a DVD-ROM, or any other means for storing data.

The network interfaces 318 and 334 may comprise at least one of a wired network card, a wireless network card, an antenna and some other means for communicating with a network. The network interfaces 318 and 334 may be connected to a local area network (LAN), or a wide area network (e.g., internet) or some other form of network. The network interfaces 318 and 334 may receive signals according to wired technologies including but not limited to Ethernet, telephone (e.g., POTS), and fiber optic systems, and/or wireless technologies including but not limited a code division multiple access (CDMA or CDMA2000) communication system, a time division multiple access (TDMA) system such as GSM/GPRS (General Packet Radio Service)/EDGE (enhanced data GSM environment), IEEE 802.11 systems, and OFDM systems. The network interfaces 318 and 334 may be used to transmit and/or receive a variety of types of data including, but not limited to, voice, video, and multimedia data.

Generally, there are different kinds of adaptive resource allocation to be considered. In one example, feedback may be provided to enable dynamic transmitter rate adaptation. In one embodiment, the receiver 114, based on the available CSI, may explicitly make decisions about resource allocation on behalf of the transmitter 110. In another embodiment, the transmitter 110 may allocate its resources based on, at least in part, the available feedback from the receiver 114. CSI may comprise raw quantization (e.g., converting the channel estimates of the receiver 114 to discrete values without performing any significant additional processing) of the receiver CSI, which is applicable to embodiments in which the receiver 114 aids the decision-making process at the transmitter 110 by providing the transmitter 110 with more information about the current channel conditions. In such an embodiment, the transmitter 110 may communicate its resource allocation decisions to the receiver 114 to ensure that the receiver 114 recovers reliably any information transmitted to it from transmitter 110. In the embodiments where the receiver 114 makes decisions about resource allocation on behalf of the transmitter 110, the receiver 114 is automatically informed of the adaptations, during the receiver decision-making process.

In one embodiment, to further benefit from adaptive transmission schemes, it may be desirable for the transmitter 110 to have accurate and current (e.g., not outdated) CSI on a per-bin basis. In general, the CSI may be a function of the channel conditions estimated at the receiver 114 by the channel estimator 338. Typically, the CSI at the receiver 114 comprises at least a real (or complex) number for each tone. The CSI provides an indicator of the current channel conditions on a per tone basis. If this information in its entirety is fed back to the transmitter 110, this may impose a high amount of traffic on the feedback channel 122. The transmitter 110 may not need the entire receiver CSI in order to perform the necessary adaptive control. Instead, the receiver 114 may quantize the CSI by identifying a partition of the space of receiver CSI into a set of contiguous and disjoint subsets. This partitioning may be done such that for all CSI elements in each of the subsets, the adaptive transmission scheme assigns the same resources. For example, such resources may include: (i) the number of bits in a bit loading algorithm, or (ii) the transmission power in an adaptive power control scheme, etc. The index of the relevant subset may then be fed back to the transmitter 110.

Even with this quantized feedback mechanism, the amount of CSI may be quite large. A quantized feedback mechanism may still result in a large amount of CSI if the adaptive transmission scheme dynamically adjusts its resources on a per-tone basis. In one embodiment, there may be a Link Feedback Information Element (IE) which comprises a single byte of CSI transmitted from the receiver 114 to the transmitter 110 over the feedback channel 122. In one embodiment, the CSI may not be on a per tone basis, but may instead be on a per bin basis, as discussed below in conjunction with FIGS. 5A through 5D. The Link Feedback IE may also comprises 2 bytes to indicate a device address for the device that the CSI is associated with, 1 byte for an element ID, and 1 byte to specify the length of the Link Feedback IE. The element ID may indicate the type of the IE. For example, in the ECMA-368 standard, the Link Feedback IE is assigned a numerical value of 16 for its element ID. In another embodiment, a single Link Feedback IE may be used to provide CS to multiple transmitters. One embodiment may use 4 bits to update data rate and 4 bits to update transmitter power level changes.

As discussed above, the transmitter 110 does not only periodically adapt the transmission data rate, but may also perform more sophisticated dynamic power allocation and other coding/modulation techniques on individual tones. More refined adaptive schemes may demand a finer granularity of CSI feedback, and may impose a higher load on the feedback channel 122. As described further below, dynamic adaptation may be done at the transmitter 110 based on quantized CSI feedback from the receiver 114 on the feedback channel 122.

In one embodiment, the receiver 114 may estimate various channel parameters, such as the signal-to-noise ratio (SNR) for each tone, and may use this SNR estimate as an indicator of the channel strength. An adaptive transmitter power control algorithm may dynamically adjust the transmitter power level according to the receiver SNR estimate to maximize the average transmission rate over all the data tones. The transmitter 110 may also perform other dynamic coding and modulation schemes based on the quantized SNR information. In this embodiment, partitioning the SNR space into K subsets will require a feedback load (e.g., the amount of information needed to convey CSI to the transmitter 110) of $N_b = \lceil \log_2 K \rceil$ (1 bits per tone per feedback update. For example, with $N_b=6$, a granularity of $2^6=64$ different quantization levels of SNR may be accommodated. Assuming $N_t=100$ tones, the feedback load in this case is 100*6=600 bits per update, which may be larger than desired.

In one embodiment, systems and methods are provided for compressing feedback load (e.g., reducing the amount of CSI) without significantly altering the performance of the adaptive transmission schemes. As discussed above, channel characteristics of communications systems, including the communication system 100 may be highly correlated in several ways. A measure of the duration of time during which channel conditions are substantially unchanged may be referred to as a "coherence time interval", which may be of the order of several milliseconds. On the other hand, the duration of a data packet may typically be of the order of only a few microseconds. For example, with a transmitter-receiver relative mobility speed of v=3 m/s and a carrier frequency $f_c$=4 GHz, a practical estimate of the coherence time is given by $$T_c \approx \frac{0.423c}{vf_c} = \frac{0.423 \times 3 \times 10^8}{3 \times 4 \times 10^9} \approx 10 \text{ ms.}$$

One embodiment specifies variable-sized medium access control (MAC) packets whose transmission duration may range from 0.3125-112.5 μs. Therefore, several consecutive transmitted packets may experience nearly identical channel conditions between the transmitter 110 and the receiver 114.

Figure 4:
FIG. 4 is a table illustrating an exemplary assignment of feedback bits representing different bit rates for the wireless communication system of FIG. 3.

FIG. 4 is a table 400 illustrating an exemplary assignment of feedback bits representing different bit rates for the wireless communication system 100 of FIG. 3. As shown in the table 400, different data rates may be represented by different bit patterns. The table 400 shows the bit patterns used to represent the 8 different data rates. The "Rate (Mbps)" column indicates the speed of the data rate for the Tones 1 through N as shown in FIG. 3. The "Bits" column indicates the bit pattern used to represent the corresponding data rate. For example, Tone 1 in channel 118 may be operating at a data rate of "80 Mbps." The data rate of "80 Mbps" is represented by the bit pattern "001."

For the following description, let $N_t$ denote the number of tones, Tone 1 to N, being used by the channel 118 to communicate data between the transmitter 110 and the receiver 114 of the communication system 100, as shown in FIGS. 1 and 3. Let $N_b$ denote the number of bits of CSI required per update per tone. Then, the total number of feedback bits that needs to be sent via the feedback channel 122 is $N_t*N_b$ per update. Note that $N_b$ may depend on the dynamic resource allocation schemes adapted at the transmitter 110. For example, referring to FIG. 2 and FIG. 3, the table 200 shows that the 8 different data rates used by Tones 1 through N of the communication system 100, are each represented using 3 bits. In another embodiment the communication system 100 may use 16 different data rates, which would require 4 bits to represent all of the 16 data rates. Thus, in this embodiment, $N_b$=4.

Referring to FIG. 3, the communication system 100 has a rate adaptation scheme in which the transmitter 110 assigns to each of Tone 1 to N, one of the following 8 data rates: 53.3 Mbps, 80 Mbps, 106.7 Mbps, 160 Mbps, 200 Mbps, 320 Mbps, 400 Mbps and 480 Mbps. In this example, the receiver 114 adapts to data rates that are mapped (e.g., assigned) based on the receiver CSI. This mapping may be performed at the receiver 114 based on the receiver CSI, and is transparent to the transmitter 110 (e.g., the transmitter 110 does not know what the actual mapping is). The receiver 114 may convey only the mapped state value to the transmitter 110 via the feedback channel 122. The table 400 shows each of the 8 possible rates represented by $N_b=\log_2 8=3$ bits. Assuming $N_t=100$ tones, the amount of feedback needed per update for all of the 100 tones would be 100*3=300 bits.

In one embodiment, a spectral binning algorithm may be used to judiciously combine (e.g., group or designate) several adjacent tones into a single spectral group (e.g., bin). According to this embodiment the feedback mechanism provides CSI updates on a per-bin basis instead of the per-tone basis as discussed earlier. This provides a feedback compression factor of $N_t/K_b$, where $N_t$ is the total number of tones and $K_b$ is the number of spectral bins. In one embodiment, the binning algorithm may combine a fixed number of tones in each bin, or the number of tones in different bins may be different. Furthermore, in another embodiment, the mapping from tones to bins may be determined beforehand and kept unchanged during the entire communication process. In yet another embodiment, the mapping may be dynamically changed during the course of communication. Higher variability in the binning algorithm may lead to finer granularity in the feedback process, and may incur a greater feedback load. The choice of the appropriate level of granularity may depend on the design constraints of the communication system 100. For more information regarding binning, see U.S. patent application Ser. No. 12/716,032.

Figure 5:
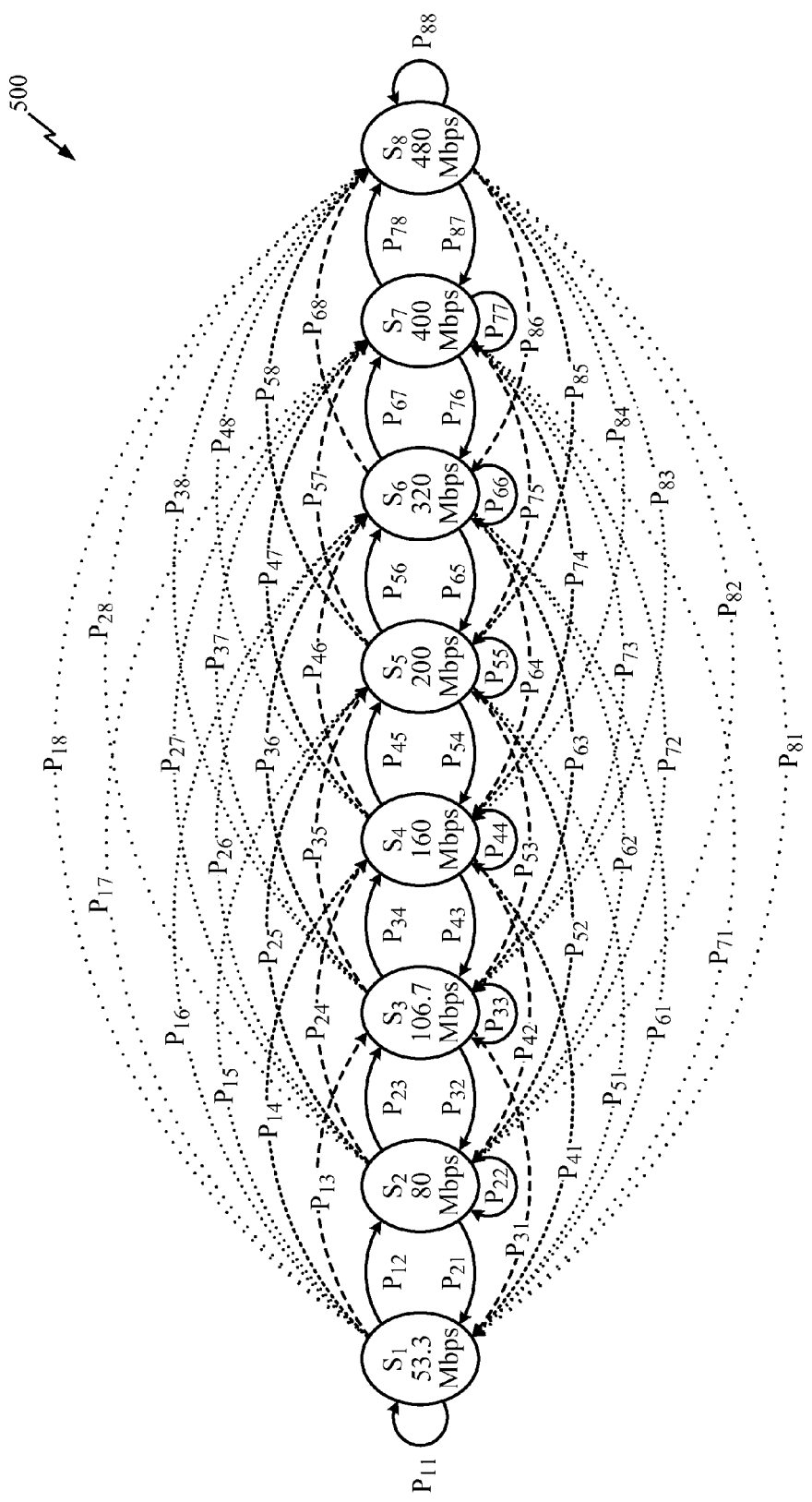
FIG. 5 shows an exemplary Markov chain model showing the probabilities associated with state transitions for various bit rates of FIG. 4, which may be used by the communication system of FIG. 3.

FIG. 5 shows an exemplary Markov chain model 500 showing the probabilities associated with state transitions for various bit rates of FIG. 4, which may be used by the communication system 100 of FIG. 3. A Markov chain model generally refers to a state diagram that comprises a finite number of states and some known probabilities $p_{i,j}$, where $p_{i,j}$ is the probability of moving from state i to state j. The model 500 comprises a total of 8 states, $S_1$ through $S_8$. Each state $S_1$ through $S_8$ has transitions, which are represented by dotted and solid lines, to the other 7 states and to itself. For example, the dotted line going from $S_1$ to $S_2$ represents a transition from $S_1$ to $S_2$. The probability for each transition is labeled $p_{i,j}$, next to the dotted line representing the transition, where For example, the probability of transitioning from $S_1$ to $S_2$ is labeled $P_{12}$.

Referring to FIG. 3, the channel 118 may have a wide spectral bandwidth (e.g., the Tones 1 through N may span a wide range of frequencies, as shown in FIG. 2). This wide spectral bandwidth may allow for fine delay resolution (e.g., resolution of errors caused by delays along multiple paths) and robustness to multipath fading (e.g., fading as a result of the multiple paths a radio wave may travel between the transmitter 110 and the receiver 114). In one embodiment, the communication system 100 may comprise a short range communication system. In this embodiment, the channel 118 may be modeled as a slowly varying fading channel (e.g., a channel which experiences fading or distortions in a slow manner). Several consecutive packets sent between the transmitter 110 and the receiver 114 may experience similar fading conditions. Under such circumstances, the receiver 114 may not need to send CSI to the transmitter 110 as frequently. The frequency with which the receiver 114 will send CSI may depend on the channel coherence time (e.g., the measure of the duration of time during which channel conditions are substantially unchanged). In one embodiment, the channel coherence time of the channel 118 may be on the order of several milliseconds. The channel coherence time for the channel 118 may vary depending on the nature of the channel 118.

In one embodiment, the channel 118 of the communication system 100 may comprise a time-varying fading channel (e.g., a channel which experiences fading or distortions). In this embodiment, the channel 118 may be modeled as a block-fading channel in which fading coefficients are assumed to be random variables that remain constant over time intervals of a fixed duration. The fixed time intervals may be the same as the coherence time interval. These fading coefficients may also vary across successive such intervals in an independent and identically distributed (IID) manner (e.g., each variable has the same probability distribution as the others and all are mutually independent). Modeling the channel 118 as a block-fading channel may be useful for theoretical performance analysis, e.g., in the computation of channel capacity, variation of error probability, or capacity versus outage. However, for certain embodiments of the communication system 100, this block-fading channel model may not efficiently capture the variability of the channel 118.

In some embodiments, the channel 118 may vary slowly and smoothly from one coherence interval to the next. There may be occasional, sharp variations in the channel 118 due to sudden changes in the surrounding environment (e.g., in an indoor environment when a person walks into the room), but these variations generally occur infrequently. When receiver 114 transmits CSI to transmitter 110, it may be desirable to use quantized values of the channel conditions for the Tones 1 through N in channel 118. A separate quantized value may be calculated for each of the Tones 1 through N in channel 118. These quantized values are generally expected to vary more slowly and steadily than the channel fade. The slower variance of the quantized values may be exploited to reduce the amount of information transmitted over the feedback channel 122.

A Markov chain model, such as model 500 may comprise a state diagram which models the probabilities of transitioning from any given state ($S_1$ through $S_8$), to any other given state ($S_1$ through $S_8$). The states in the model 500 may represent possible quantized values of the channel conditions for each of the Tones 1 though N in channel 118. These quantized values may be transmitted from the receiver 114 to the transmitter 110 over the feedback channel 122 of the communication system 100. The state transition probabilities (e.g., $P_{12}$) may represent the probability that the quantized values of the channel conditions for each of the Tones 1 though N in channel 118 will change from one level to another level between CSI updates.

The model 500 may be considered a Markov chain model for the rate adaptation scheme shown in FIG. 4. For example, referring to FIG. 3, the current channel conditions may translate to the maximum allowable data rate for Tone 1 in channel 118 to be 80 Mbps. Thus, the quantized value of the current state of the Tone 1 corresponds with state $S_2$ of the model 500. Due to varying channel conditions for Tone 1, the maximum allowable data rate for Tone 1 could increase or decrease. The maximum allowable data rate may be the maximum feasible data rate to communicate between the transmitter 110 and the receiver 114, based on a performance condition (e.g., a probability of error in the communication) The probability $P_{24}$, shown in the figure, is the probability that the maximum allowable data from for Tone 1 will change from 80 Mbps (shown as state $S_2$) in the current time step to 160 Mbps (shown as state $S_4$) in the next time step.

In another example, the current maximum allowable data rate for Tone 2 in channel 118 may be 200 Mbps. Thus, the quantized value of the current state of the Tone 2 corresponds with state $S_5$ of the model 500. Due to varying channel conditions for Tone 2, the maximum allowable data rate for Tone 1 could decrease. The probability $P_{51}$, shown in the figure, is the probability that the maximum allowable data from for Tone 2 will change from 200 Mbps (shown as state $S_5$) in the current time step to 53.3 Mbps (shown as state $S_1$) in the next time step. In one embodiment, the duration of time in between transmissions of CSI from the receiver 114 to the transmitter 110 may be close to the coherence interval. In this embodiment, the state transition probabilities from any state $S_1$ through $S_8$ to any other state $S_1$ through $S_8$ may be similar for all states.

Figure 6:
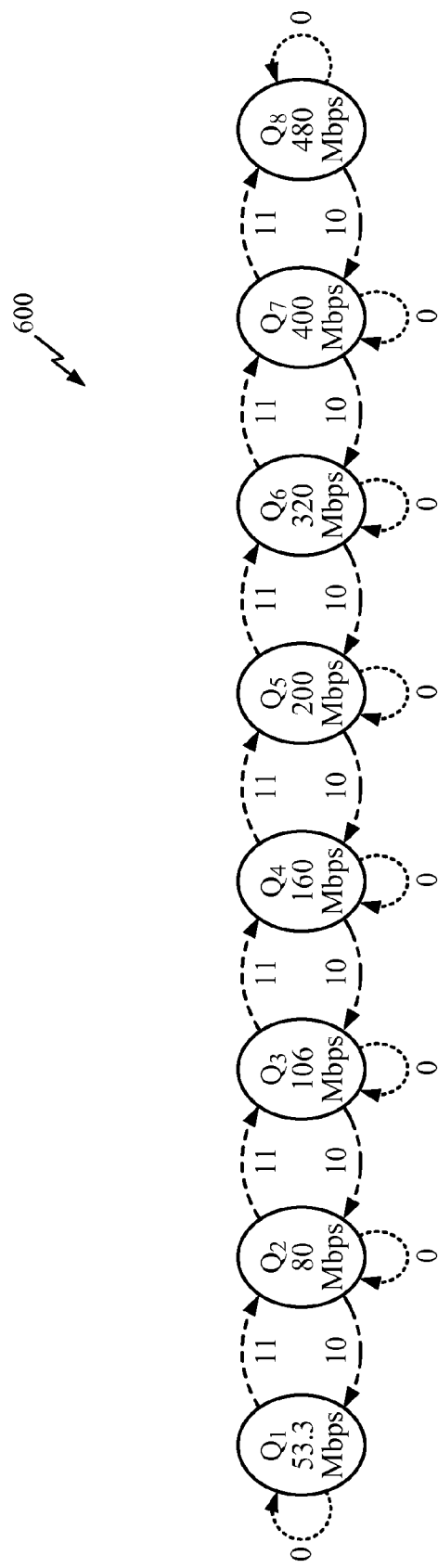
FIG. 6 shows a reduced Markov chain model according to a first embodiment.

FIG. 6 shows a reduced Markov chain model 600 according to a second embodiment. The reduced model 600 comprises a total of 8 states, $Q_1$ through $Q_8$. Each state $Q_1$ through $Q_8$ has transitions, which are represented by lines between the states. For example, the line going from $Q_1$ to $Q_2$ represents a transition from $Q_1$ to $Q_2$. State $Q_1$ has a transition to itself and a transition to state $Q_2$ only. State $Q_8$ has a transition to itself and a transition to state $Q_7$ only. States $Q_2$ through $Q_7$ each have a transition to themselves, a transition to the next lower state, and a transition to the next higher state. For example, state $Q_2$ has a transition to itself, a transition to state $Q_1$, and a transition to state $Q_3$. The transitions are all labeled with one of the following bit patterns: 0, 10, and 11. A transition from a state to itself is labeled "0." For example, the transition from state $Q_2$ to state $Q_2$ is labeled "0." A transition from a state to the next lowest state is labeled "10." For example, the transition from state $Q_2$ to state $Q_1$ is labeled "10." A transition from a state to the next highest state is labeled "11." For example, the transition from state $Q_2$ to state $Q_3$ is labeled "11."

In one embodiment, the duration of time between CSI updates may be smaller than the coherence interval. In this embodiment, the state transition probabilities for states placed farther apart from each other will be lower than the probabilities for nearer or adjacent states. For example, referring to model 500 of FIG. 5, the probability $P_{18}$ of transition from $S_1$ to $S_8$ may be much lower then the probability $P_{12}$ of transitioning from $S_1$ to $S_2$. In this embodiment, a reduction in the amount of CSI sent to transmitter 110 by receiver 114 transmits may be achieved by assigning more importance to the high probability state transitions and less importance to low probability state transitions in the Markov model. In one embodiment, high probability state transitions may correspond to shorter transitions in the model 500. In another embodiment, low probability state transitions may correspond to longer transitions in the model 500.

As discussed earlier, the channel 118 of the communication system 100 may have a slowly varying nature. The interval of time between CSI updates may be chosen to be much smaller than the channel coherence time. In one embodiment, the highest probability transitions in model 500 may be the transitions from one state to itself (e.g., transition from state $S_2$ to state $S_2$) and the transitions to the next highest and/or next lowest state (e.g., transitions from state $S_2$ to state $S_1$ and/or $S_3$). This information may be used to prune (e.g., remove) some of the transitions in the model of FIG. 5, resulting in the reduced model 600 shown in FIG. 6.

In one embodiment, the reduced model 600 may allow a coding scheme that allows differential CSI (e.g., information showing the difference between an existing rate level and an updated rate level) to be used. This embodiment may incur less feedback load on an average. The differential feedback scheme according to this embodiment encodes the state transition from one feedback update to another. The reduced model 600 illustrates a state transition model and the differential feedback scheme for the rate adaptation scheme shown in FIG. 4.

As discussed earlier, a transition from a state to itself is represented by the bit pattern "0," a transition from a state to the next higher state is represented by the bit pattern "11," and a transition from a stet to the next lower state is represented by the bit pattern "10." Referring to FIG. 3, the states $Q_1$ through $Q_8$ of the reduced model 600 may represent the current data for one or more of Tones 1 through N in channel 118 of communication system 100. For example, the current state of Tone 1 may be $Q_3$, which indicates that the maximum allowable data rate for Tone 1 is 106.7 Mbps. As the channel quality for one or more of Tones 1 through N changes, the data rate for the one or more tones may change. For example, the state of Tone 1 may change from $Q_3$ to $Q_2$, which indicates that maximum allowable data rate for Tone 1 has changed to 80 Mbps. The receiver 114 may transmit differential CSI to the transmitter 110 to inform the transmitter 110 of the change in the maximum allowable data rate for Tone 1. For example, the receiver may transmit the bit pattern "10" to indicate a transition from $Q_3$ to $Q_2$. If there is no change in the maximum allowable data rate for Tone 1, the receiver 114 may transmit the bit pattern "0" to the transmitter 110 over the feedback channel 122.

The embodiment of the reduced model 600 and the differential feedback scheme may allow the receiver 114 to transmit less CSI to transmitter 110 over the feedback channel, as shown in FIG. 3. Assuming an equal number of transitions from one state to itself (e.g., $Q_2$ to $Q_2$) and transitions from one state to the next level state (e.g., $Q_2$ to $Q_3$) the average number of bits that a receiver 114 may transmit may be around 1.5 bits. According to the embodiment shown in FIG. 6, depending on the conditions of the Tones 1 through N in the channel 118 of the communication system 100, the number of bits needed by the receiver 114 to transmit CSI may be less than or equal to 2 bits per tone. In one embodiment, the average feedback load using this differential feedback scheme is lower than the feedback load corresponding to a full feedback scheme (e.g., wherein data representing each and every state is always transmitted without compression).

The reduced model 600 of FIG. 6 uses either a single bit (e.g., "0") or two bits (e.g., "11") to indicate transitions from one state to another state. In one embodiment, the use of a single bit or two bits (e.g., variable length code) is uniquely decodable. For example, if the transmitter 110 receives the bit "0" from the receiver 114, then the transmitter 110 may determine that all the necessary information has been received to determine the next state transition. This is due to the use of the bit pattern "0" to represent all transitions from a state to itself. If the transmitter 110 receives the bit "1" from the receiver 114, then the transmitter knows that it must receive one more bit in order to determine the next state transition. This is because the bit patterns representing the transitions from one state to the next higher and next lower state always begin with a "1." A variety of variable length codes may be used in conjunction with certain embodiments.

Figure 7:
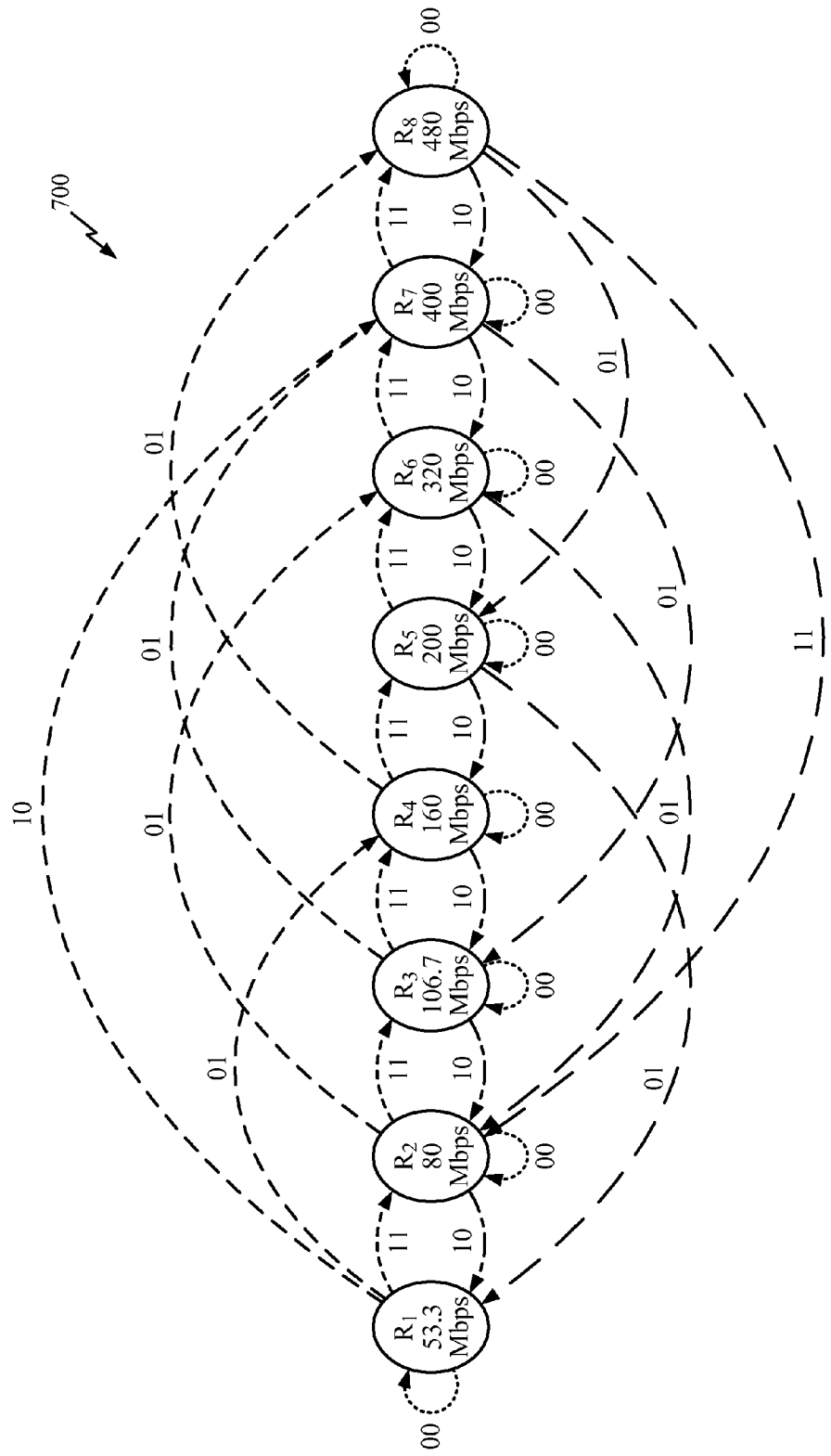
FIG. 7 shows another reduced Markov chain model according to a second embodiment.

FIG. 7 shows another reduced Markov chain model 700 according to a second embodiment. The reduced model 700 comprises a total of 8 states, $R_1$ through $R_8$. Each state $R_1$ through $R_8$ has transitions, which are represented by both solid and dotted lines between the states. The solid lines represent transitions from one state to itself or to the next higher/lower state. For example, the solid line going from $R_1$ to $R_2$ represents a transition from $R_1$ to $R_2$. The dotted lines represent larger transitions. For example, the dotted line going from $R_1$ to $R_7$ represents a transition from $R_1$ to $R_7$. The transitions are all labeled with one of the following bit patterns: 00, 01, 10, and 11.

As shown in FIG. 6, the reduced model 600 only has transitions from a state to itself, and from a state to the next higher and/or lower state. Referring to FIG. 3, in certain situations, the channel quality for one of the Tones 1 through N may change quickly. For example, within one CSI update period (e.g., the time between CSI updates), the channel quality of Tone 1 through N may degrade from state $S_8$ to $S_5$. This may occur when an object moves in between the transmitter 110 and the receiver 114, for example, in an indoor environment when a person walks into a room and moves between the transmitter 110 and the receiver 114. Using the reduced model 600 of FIG. 6, the receiver 114 would transmit 3 CSI updates (e.g., a total of 6 bits) to the transmitter 110 in order to indicate that the channel quality for one of Tones 1 through N has degraded from $S_8$ to $S_5$. For example, the first CSI update would indicate a transition from $S_8$ to $S_7$, the second CSI update would indicate a transition from $S_7$ to $S_6$, and the third CSI update would indicate a transition from $S_6$ to $S_5$. Larger jumps in reduced model 600 (e.g., faster changing channel conditions) may require the receiver 114 to transmit multiple CSI updates to the transmitter 110 in order to indicate a change in the channel conditions for the Tones 1 through N in channel 118.

One embodiment may add larger transitions to the reduced model 600 of FIG. 6, as shown in the reduced model 700 of FIG. 7. For example, reduced model 700 has a larger transition from $R_1$ to $R_4$. Reduced model 700 also has a larger transition form $R_8$ to $R_2$. These longer jumps may facilitate the feedback mechanism to track large state transitions, e.g., between two non-adjacent or non-consecutive states. In this embodiment, the larger transitions may allow the receiver 114 to indicate larger transitions without transmitting as many CSI updates to the transmitter 110, as discussed above. In this embodiment, the feedback load may be 2 bits per tone, which is lower than the 3 bits which would normally be required to transmit CSI per tone, as shown in FIG. 4.

Figure 8:
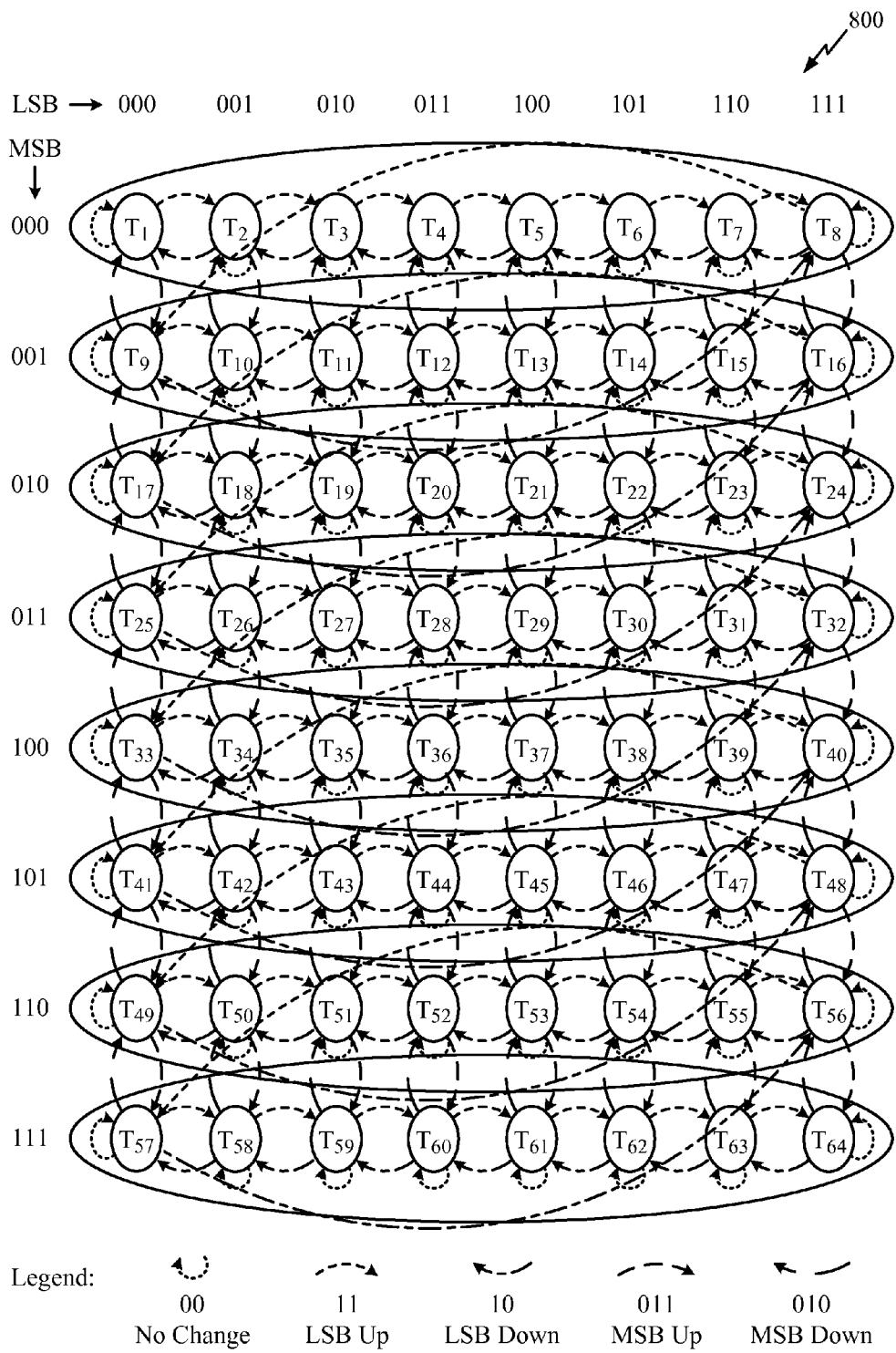
FIG. 8 shows a 64-state Markov model according to a third embodiment.

FIG. 8 shows a 64-state Markov model 800 according to a third embodiment. Markov model 800 has a total of 64 states, $T_1$ through $T_{64}$. States $T_1$ through $T_{64}$ are divided such that there are 8 states per row and 8 states per column. For example, states $T_1$ through $T_8$ are on the first row and states $T_9$ through $T_{18}$ are on the second row. Each state has transitions next higher and/or lower state. For example, state $T_7$ has a transition to $T_8$ and state $T_8$ has a transition to state $T_9$. Each state also has transitions to the states which are above and/or below the state. For example, state $T_2$ has a transition to state $T_{10}$, and state $T_{10}$ has a transition to state $T_2$.

As discussed above, the embodiments shown in FIGS. 5 through 7 use temporal correlation to reduce the amount of CSI that a receiver 114 may need to send for the 8 data rates possible for each of the Tones 1 through N of the channel 118. In another embodiment, the transmitter 110 may perform more advanced adaptive resource allocation schemes, which may require more granular C SI from the receiver 114. A higher level of granularity may require more states in the Markov state model, which in turn implies that the differential feedback updates may require a longer time to react to larger and/or faster changes in the channel conditions of the Tones 1 through N of the channel 118. As discussed above, introduction of larger transitions in the reduced model 800 may help reduce such delay. It is desirable to formalize a procedure for allowing larger transitions. In one embodiment, the state space (e.g., the range of states) may be partitioned into two granularity levels, one corresponding to the short state transitions and the other corresponding to long state transitions.

As discussed above in FIG. 3, the receiver 114 may quantize SNR into 64 different quantization levels. In order to convey the quantization level of each of the Tones 1 through N, from the receiver 114 to the transmitter 110, 6 bits are required. As discussed above in conjunction with FIG. 7, it is possible to reduce the amount of CSI transmitted by the receiver 114 per update per tone to 2 bits. However, this may be inefficient if there are many states. A large number of states may result in the transmission of more CSI packets in order to converge to the actual SNR level. It may be necessary to introduce even larger transitions across the state space that will allow faster convergence and better tracking of the channel quality of each of the Tones 1 through N of channel 118.

One embodiment partitions the 6-bits needed to represent the 64 SNR quantization levels into two halves. The first half comprises the three most significant bits (MSBs), and the second half comprises the three least significant bits (LSBs). For example, in the bit pattern "111000", the three MSBs are "111" and the three LSBs are "000." This embodiment employs a differential update scheme in which an update is provided for either the least significant bits (e.g., shorter transitions) or for the most significant bits (e.g., larger transitions), at each feedback update.

As shown in FIG. 8, there are 5 types of allowable state transitions: (i) no transition, which is encoded by "00", (ii) a short jump to the higher LSB neighbor (e.g., a one bit addition to the LSBs), which is encoded by "11", (iii) a short jump to the lower LSB neighbor (e.g., a one bit subtraction from the LSBs), which is encoded by "10", (iv) a long jump to the higher MSB neighbor (e.g., a one bit addition to the MSBs), which is encoded by "011", and (v) a long jump to the lower MSB neighbor (e.g., a one bit subtraction from the MSBs), which is encoded by "010". The average feedback load in this embodiment may be in a range of 2 to 3 bits. In one embodiment, an additional bit may be required to indicate whether the feedback update corresponds to the MSBs or the LSBs. The gains due to compression may be larger in this embodiment, since the full update mechanism requires 6 bits per update per tone, and the differential mechanism requires around 2-3 bits per bin per update.

Figure 9:
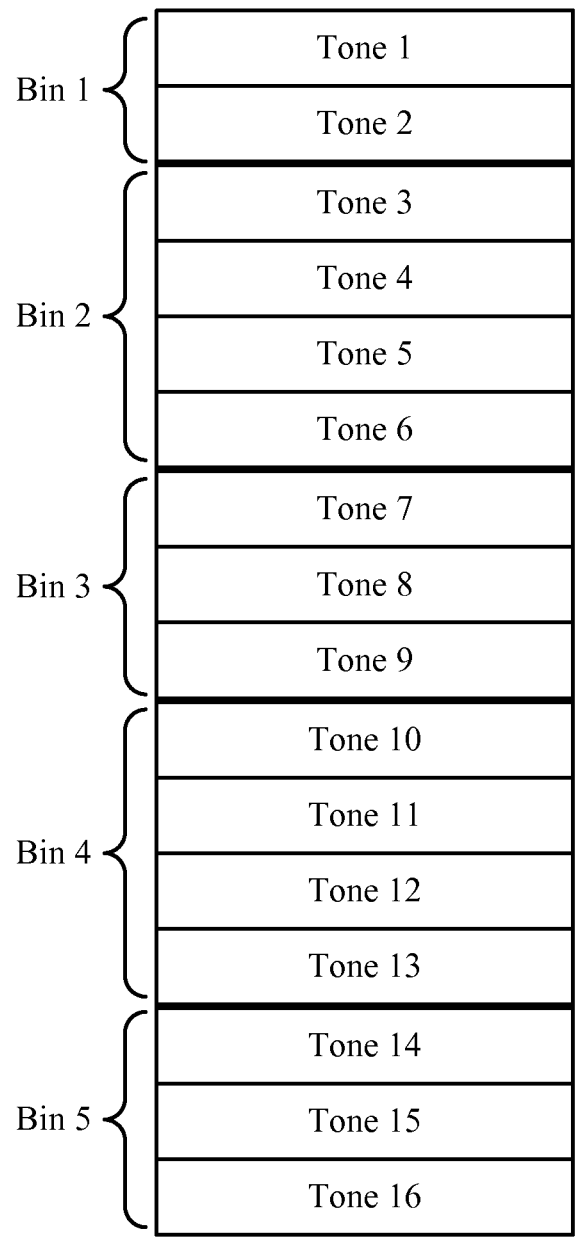
FIG. 9 is a diagram illustrating an exemplary binning of tones according to one embodiment.

Further compression may be achieved by combining the differential state update scheme that exploit temporal correlation discussed herein with the binning schemes that exploit spectral correlation discussed in U.S. patent application Ser. No. 12/716,104. FIG. 9 is a diagram illustrating an exemplary binning of tones according to one embodiment. In this embodiment, there are a total of 16 tones. Each of the Tones 1-16 is designated to one of spectral Bins 1-5. Tones 1 and 2 are designated to Bin 1, Tones 3 through 6 are designated to Bin 2, Tones 7 through 9 are designated to Bin 3, Tones 10 through 13 are designated to Bin 4, and Tones 14 through 16 are designated to Bin 5. Each of the Tones 1 through 16 may be designated to one of Bins 1-5 based on, at least in part, the channel characteristics of the tones. Each of Tones 1 through 16 may be designated to one of Bins 1-5 based on other factors. A variety of factors may be used to designate each of the Tones 1 through 16 to a Bins 1 through 5.

In one embodiment, a fixed-size binning algorithm may be used wherein an equal number of tones (e.g., 4 tones) are designated to each bin. In another embodiment shown in, there may be a variable-sized binning algorithm wherein a finer level of granularity may be achieved by allowing different bins to have a different number of tones, as shown in the FIG. 9. In yet another embodiment, a static binning algorithm may be used wherein the tones are not re-designated to different bins, even if their channel conditions change. The static binning algorithm may be used alone, or in combination with the fixed and the variable binning embodiments discussed above. In a certain embodiment, the receiver 114 may designate a fixed number of tones per bin, and once the designation is set, the tones are not re-designated to different bins, even if their channel conditions change. In another embodiment, the receiver 114 may designate a variable number of tones per bin, and once the designation is set, the tones are not re-designated to different bins, even if their channel conditions change. In one embodiment, a dynamic binning algorithm may be used, wherein different tones may be re-designated to different bins, depending on the channel conditions. The dynamic binning algorithm may be used alone, or in combination with the fixed and the variable binning embodiments discussed above.

In addition, a variety of methods may be used to provide CSI on a per bin basis. For example, the average noise level for all the tones in a bin may be used to provide CSI for the bin. In another example, the highest noise level or lowest noise level for all the tones may be used to provide CSI for the bin. In yet another example, the median noise level for all the tones may be used to provide CSI for the bin. Other examples of methods that may be used to provide CSI on a per bin basis include, but are not limited to, average noise level, or the average SNR, or average RSSI, and average SINR. In another embodiment, the averaging could be done over the assigned rates of individual tones in the bin to compute an average rate for the bin. In general, these schemes may applicable to any kind of mapping from the CSI or assigned rates of individual tones in each bin to a corresponding single value for the entire bin.

The above-embodiments may be applicable to spectral bins, such as Bins 1-5. The models 500, 600, 700, and 800 may be used to represent quantized CSI and transitions on a per bin basis, rather than a per tone basis. For example, referring to FIG. 6, the current state of Bin 1 may be state $Q_5$. The current state of Bin 1 may be computed by using the average data rate of the Tones 1 and 2 in Bin 1. If the state of Bin 1 changes to state $Q_6$, the receiver 114 may transmit the bit pattern "11" over the feedback channel 118 to indicate the change in the channel characteristics for Bin 1.

In one embodiment, differential state updates may be used to reduce the amount of CSI transmitted on feedback channel 118. After an initial full state update (e.g., an update comprising full CSI), only differential state updates are transmitted on the feedback channel 118. This embodiment may be useful for slow fading channels where the channel coherence time is much larger then the feedback update interval. Another embodiment may use only shorter transitions, as shown in FIG. 6, when providing CSI via the differential updates. Yet another embodiment may use both shorter and longer transitions, as shown in FIG. 7, when providing CSI via the differential updates.

In one embodiment, a combination of both differential state updates and full state updates may be used to reduce the amount of CSI transmitted on feedback channel 118. In this embodiment, full state updates may be periodically used and differential state updates may be used in between the full state updates. The period in between full state updates may be based on, at least in part, the channel variability (e.g., how fast the channel conditions change). Another embodiment may use only shorter transitions, as shown in FIG. 6, when providing CSI via the differential updates. Yet another embodiment may use both shorter and longer transitions, as shown in FIG. 7, when providing CSI via the differential updates.

Certain embodiments may allow for a reduction in the amount of CSI that may need to be transmitted from the receiver 114 to the transmitter 110 over feedback channel 122. This allows for the CSI packets, which are use to transmit the CSI, to be smaller. The smaller size of the CSI packets may allow the CSI to be sent with other types of packets, as discussed in later embodiments.

Figure 10:
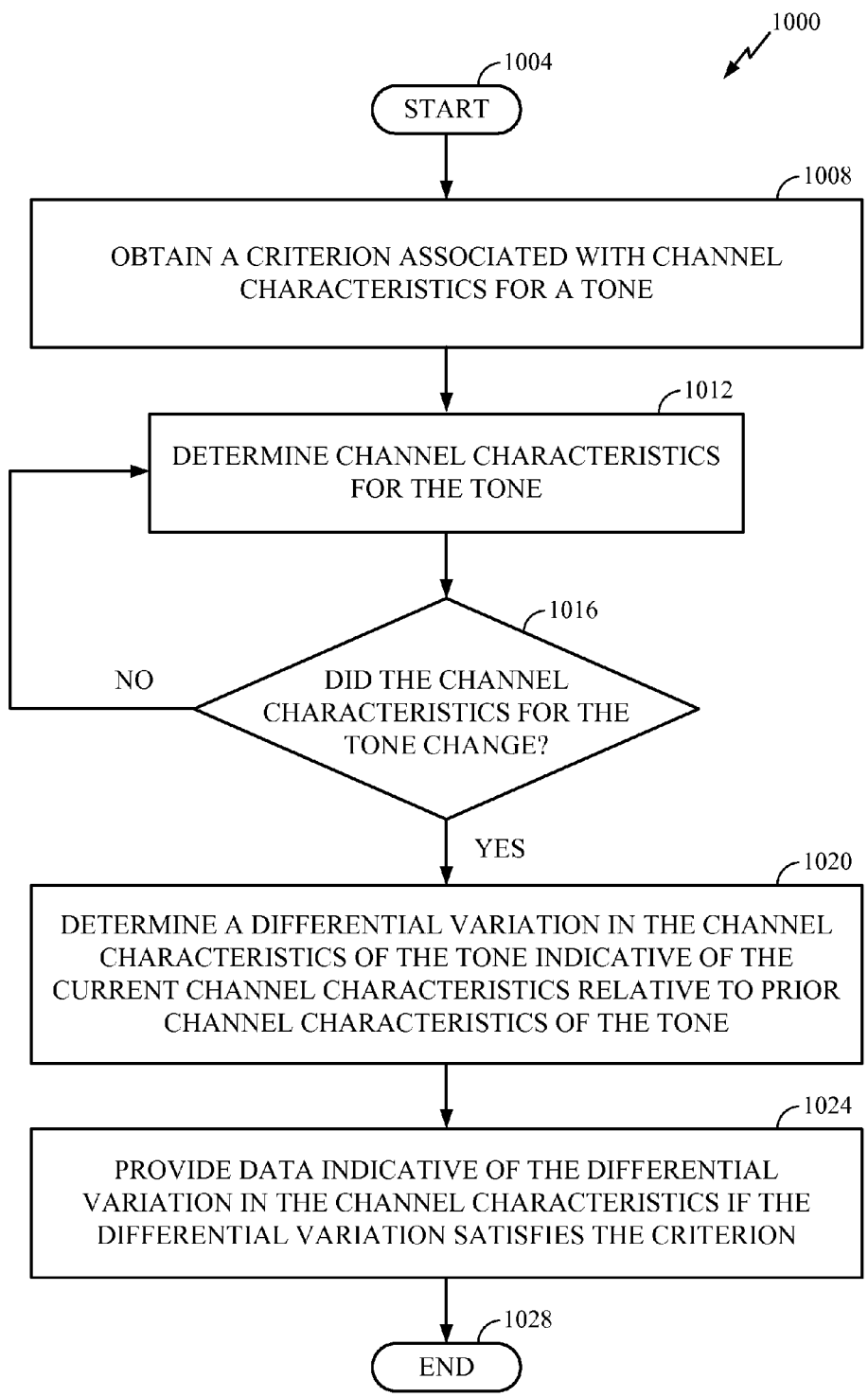
FIG. 10 is a flow chart illustrating a first exemplary communication process, which may be used by the communication system of FIG. 3.

FIG. 10 is a flow chart illustrating an exemplary first communication process 1000, which may be used by the communication system of FIG. 3. Process 1000 illustrates how the receiver 114 may communicate CSI to the transmitter 110 via the feedback channel 122 as shown in the communication system 300 of FIG. 3. In one embodiment, the process 1000 may be performed by the receiver 114 as shown in FIG. 3. In another embodiment, certain steps of process 1000 may be performed by other devices not shown in FIG. 3. Reference may be made to elements in FIG. 3 when describing process 1000.

The process 1000 begins at start block 1004. The process 1000 then moves to block 1008, where the receiver 114 obtains a criterion associated with the channel characteristics for a tone (e.g., Tone 1 of communication system 100 shown in FIG. 3). The criterion may be based on a variety of factors including, but not limited to, a probability that the differential variation will occur, a Markov model such as the models 500, 600, 700, and 800 shown in FIGS. 5, 6, 7, and 8, respectively, and a degree of the differential variation. In one embodiment, the receiver 114 may itself determine the criterion. In another embodiment, the receiver 114 may receive the criterion from another source. For example, the transmitter 110 may provide the criterion to the receiver 114. In another example, the receiver 114 may receive the criterion from a software and/or hardware module which is installed in the receiver 114. After obtaining the criterion, the process moves to block 1012, where the receiver 114 will determine channel characteristics for the tone. The receiver 114 may use the network interface 334 and/or the channel estimator 338 to determine channel characteristics for the tone. After determining the channel characteristics of the tone, the process 1000 then moves to block 1016, where the receiver determines if any channel characteristics for the tone have changed. This determination may be performed using the channel estimator 338 and/or the processor 326. In one embodiment, if the channel characteristics for the tone have not changed, the process 1000 moves back to block 1012. In another embodiment, the process may proceed to block 1020 regardless of whether the channel characteristics for the tone have changed. For example, referring to FIG. 7, if the current state of a tone is R2, and the channel conditions for the tone have not changed, the receiver 114 may determine that the channel conditions have not changed, and may transmit "00" to indicate that the channel conditions have not changed.

If the channel characteristics have changed, the process 1000 then moves to block 1020. At block 1020, the receiver 114 determines a differential variation in the channel characteristics of the tone, indicative of the current channel characteristics relative to prior channel characteristics for the tone. For example, if Tone 3, in system 100 may change from state $R_2$ to state $R_6$. The receiver 114 may the previous state $R_2$ and may determine the difference between the previous state $R_2$ and the current state R6.

After determining a differential variation, the process 1000 then moves to block 1024, where the receiver 114 provides data indicative of the differential variation in channel condition for the at least one carrier frequency if the differential variation in channel condition satisfies the criterion. The receiver 114 may use the network interface 334 and/or the CSI module 342 and/or the processor 326 to determine if the criterion is satisfied. For example, data indicative of the differential variation may be sent from the receiver 114 to transmitter 110 only if there was a high probability that the variation would occur. In another example, data indicative of the differential variation may be sent from the receiver 114 to transmitter 110 only if the degree of variation meets a certain threshold (e.g., only if the current state is less than 3 states away from the previous state). After block 1024, the process 1000 moves to the end block 1028.

In one embodiment, more than one criterion may be used in process 1000. For example, at block 1008, the receiver 114 may obtain two criteria (e.g., the degree of variation in the channel characteristics for the tone and a probability associated with the differential variation). The criteria obtained at block 1008 may be used by the process 1000 at block 1024, when the receiver 114 provides data indicative of the differential variation in channel characteristics.

Figure 11:
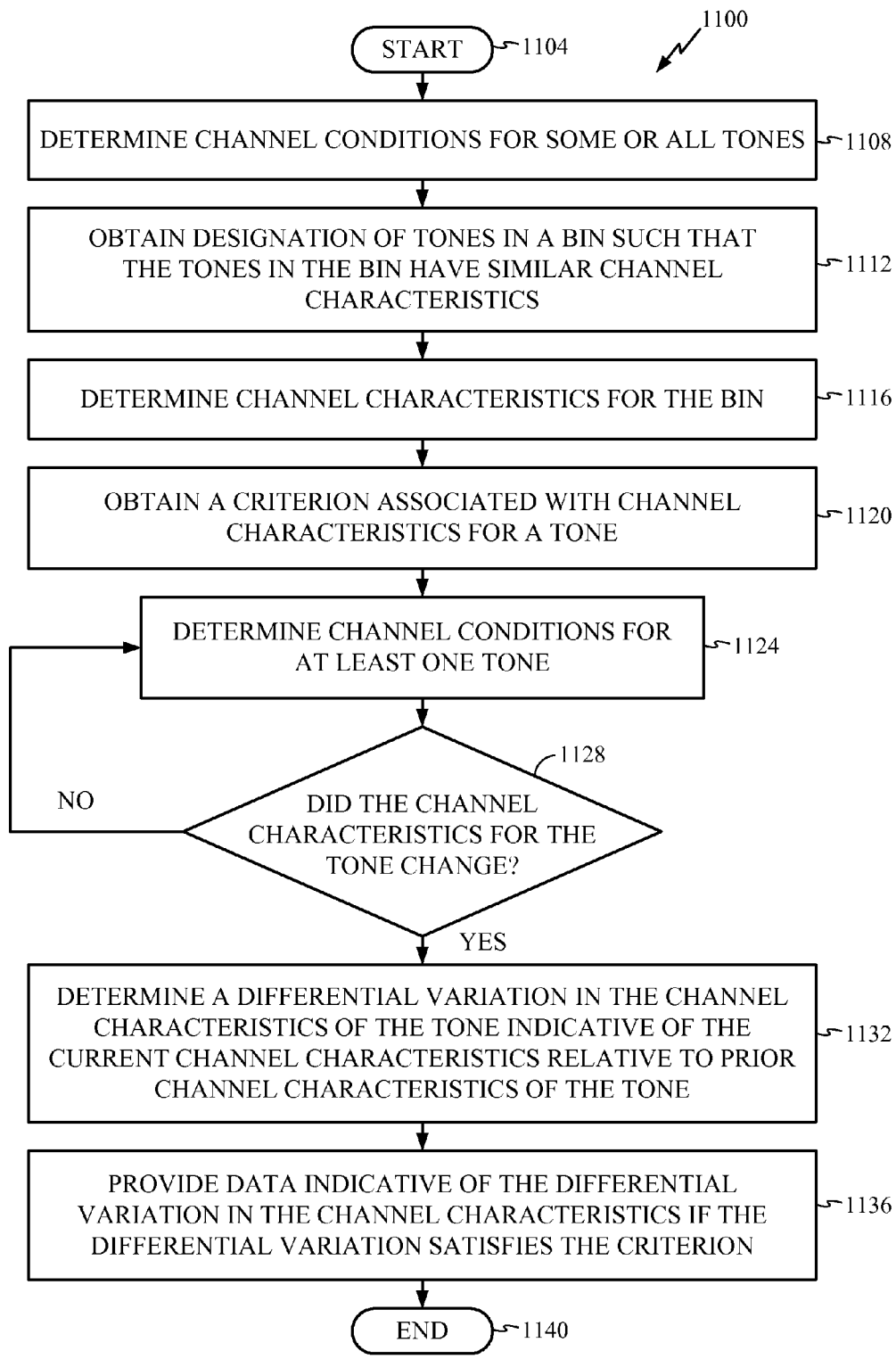
FIG. 11 is a flow chart illustrating a second exemplary communication process, which may be used by the communication system of FIG. 3.

FIG. 11 is a flow chart illustrating a second exemplary communication process, which may be used by the communication system of FIG. 3. Process 1100 illustrates how the receiver 114 may communicate CSI to the transmitter 110 via the feedback channel 122 as shown in the communication system 300 of FIG. 3. In one embodiment, the process 1000 may be performed by the receiver 114 as shown in FIG. 3. In another embodiment, certain steps of process 1000 may be performed by other devices not shown in FIG. 3. Process 1100 may be performed by the receiver 114 as shown in FIG. 3. Reference may be made to elements in FIG. 3 when describing process 1100.

The process 1100 begins at start block 1104. The process 1100 then moves to block 1108, where the receiver 114 determines channel conditions for some or all of the Tones 1 through N shown in FIG. 3. After determining the channel conditions for some or all of the Tones 1 through N, the process moves to block 1112. At block 1112, the receiver 114 designates at least some of Tones 1 through N in a bin such that the tones in the bin have similar channel characteristics. Process 1100 may initially designate the tones to different bins in the same manner shown in FIG. 9. The CSI module 342 of the receiver 114 may be used to designate Tones 1 through 16 to Bins 1 through 5 as shown in FIG. 9. Alternatively, the processor 326 of the receiver 114 may be used to designate Tones 1 through 16 to Bins 1 through 5. After obtaining the designation of the tones to the appropriate bin, the process 1100 then moves to block 1116, where the receiver 114 re-determines channel conditions for some or all of Tones 1 through 16 using channel estimator 338 and/or network interface 334.

After re-determining the channel conditions, the process moves to block 1120 where the receiver 114 obtains a criterion associated with the channel characteristics for a tone (e.g., Tone 1 of communication system 100 shown in FIG. 3). The criterion may be based on a variety of factors including, but not limited to, a probability that the differential variation will occur, a Markov model such as the models 500, 600, 700, and 800 shown in FIGS. 5, 6, 7, and 8, respectively, and a degree of the differential variation. In one embodiment, the receiver 114 may itself determine the criterion. In another embodiment, the receiver 114 may receive the criterion from another source. For example, the transmitter 110 may provide the criterion to the receiver 114. In another example, the receiver 114 may receive the criterion from a software and/or hardware module which is installed in the receiver 114. After obtaining the criterion, the process moves to block 1124, where the receiver 114 will determine channel characteristics for the tone. The receiver 114 may use the network interface 334 and/or the channel estimator 338 to determine channel characteristics for the tone. After determining the channel characteristics of the tone, the process 1100 then moves to block 1128, where the receiver determines if any channel characteristics for the tone have changed. This determination may be performed using the channel estimator 338 and/or the processor 326. In one embodiment, if the channel characteristics for the tone have not changed, the process 1100 moves back to block 1124. In another embodiment, the process may proceed to block 1020 regardless of whether the channel characteristics for the tone have changed. For example, referring to FIG. 7, if the current state of a bin is R2, and the channel conditions for the bin have not changed, the receiver 114 may determine that the channel conditions have not changed, and may transmit "00" to indicate that the channel conditions have not changed.

If the channel characteristics have changed, the process 1100 then moves to block 1132. At block 1132, the receiver 114 determines a differential variation in the channel characteristics of the bin indicative of the current channel characteristics relative to prior channel characteristics for the tone. For example, if Tone 3, in system 100 may change from state $R_2$ to state $R_6$. The receiver 114 may consider the previous state $R_2$ and may determine the difference between the previous state $R_2$ and the current state $R_6$.

After determining a differential variation, the process 1100 then moves to block 1136, where the receiver 114 provides data indicative of the differential variation in channel condition for the at least one carrier frequency if the differential variation in channel condition satisfies a criterion. The receiver 114 may use the network interface 334 and/or the CSI module 342 and/or the processor 326 to determine if the criterion is satisfied. For example, data indicative of the differential variation may be sent from the receiver 114 to transmitter 110 only if there was a high probability that the variation would occur. In another example, data indicative of the differential variation may be sent from the receiver 114 to transmitter 110 only if the degree of variation meets a certain threshold (e.g., only if the current state is less than 3 states away from the previous state). After block 1136, the process 1100 moves to the end block 1140.

In one embodiment, more than one criterion may be used in process 1100. For example, at block 1120, the receiver 114 may obtain two criteria (e.g., the degree of variation in the channel characteristics for the tone and a probability associated with the differential variation). The criteria obtained at block 1120 may be used by the process 1100 at block 1136, when the receiver 114 provides data indicative of the differential variation in channel characteristics.

The following embodiments are generally directed to systems and methods for conveying CSI from the receiver 114 to the transmitter 110 over the feedback channel 122 in the communication system 100 shown in FIG. 3. The following embodiments may also reference elements shown in FIG. 3.

As discussed above, one of the many objectives of the CSI may be to enable adaptive resource allocation of the channel 118 at the transmitter 110. Even if the communication system 100 uses the binning processes described above, the size of each CSI packet may be larger than the available fields in existing packet header (e.g., supplemental information such as addresses, type of date etc.) formats. In the communication system 100, it may be difficult to update the hardware and/or software of the transmitter 110 and the receiver 114. New types of CSI such as differential CSI (e.g., CSI which provides information about how channel characteristics have changed from the previous set of CSI) and binning CSI (e.g., CSI provided on a per bin basis) may be used by the receiver 114 and the transmitter 110. Thus, it is desirable to convey new types and/or more CSI without substantially changing the transmitter 110 and the receiver 114 of the communication system 100.

In one embodiment the CSI may comprise a new Application Specific Information Element (ASIE). The ASIE may allow new types of information to be sent in communication system 100, without substantially modifying the existing hardware/software of communication system 100. The ASIE may comprise a Specifier ID 16-bit field which identifies a company or organization who defines the format and use of the ASIE. The ASIE may be sent in beacon and/or control frames (e.g., frames which may be used to coordinate the receiver 114 and transmitter 110 and may be used to provide timing, scheduling, capability, and other information). This embodiment may not require changes in the communication system 100. If a new ASIE is transmitted from the receiver 114 to the transmitter 110, and the transmitter 110 does not support the new ASIE, the transmitter 110 may simply ignore the ASIE. This embodiment may be used when CSI is sent on a best effort basis, e.g., the feedback is sent only when the beacon slot can accommodate the CSI. In another embodiment, the CSI may comprise at least one of an Application- Specific Control Frame and an Application Specific Command Frame. The Application-Specific Control and Command Frame may also comprise Specifier ID field. The company or organization associated with the Specifier ID may define the format and use of the Data field in the Application-Specific Control or Command frames.

Another embodiment may use a block-acknowledgement (B-ACK) to send CSI. The communication system 100 (e.g., such as an OFDM system) may enable the receiver 114 to acknowledge the receipt of a sequence of MAC service data units (MSDUs) using a B-ACK packet. The B-ACKs may be sent by the receiver 114 when there is a B-ACK request from the transmitter 110 for the MSDUs sent from the transmitter 110 to the receiver 114 over the channel 118. The CSI may be sent along with the B-ACK information in an "enhanced" B-ACK packet. In this embodiment, the periodicity of CSI feedback may depend on the periodicity of the B-ACK packets. This embodiment may allow for differential CSI. In another embodiment, the CSI packets may need to be fragmented. Certain embodiments may require changes the communication system 100 as a new type of "enhanced" B-ACK may need to be defined.

In another embodiment the ASIE containing CSI may also be sent from the receiver 114 to the transmitter 110 using MAC command frames during reserved medium access slots (MASs). The reserved MASs are used by the receiver 114 to transmit the CSI to the transmitter 110 over the feedback channel 122. This embodiment may allow CSI to be sent to the transmitter 114 at consistent time intervals. The timing and frequency of CSI may be set up during the MAS reservation negotiations between the transmitter 110 and the receiver 114. In another embodiment, prioritized contention access (PCA) may be may be used to transmit CSI over the feedback channel 122 when both transmitter 110 and receiver 114 support PCA.

As shown in FIG. 3, the channel 118 may be used to transmit data between transmitter 110 and receiver 114. Data may be transmitted bi-directionally, meaning that data may be transmitted from the transmitter 110 to the receiver 114, and it may be transmitted from the receiver 114 to the transmitter 110. In one embodiment, CSI may be "piggybacked" e.g., sent along with, the data traffic sent from the receiver 114 to the transmitter 110. In this embodiment, the CSI packets may be fragmented. This embodiment may be suitable if there is steady data traffic sent from the receiver 114 to the transmitter 110.

Figures 12, 13:
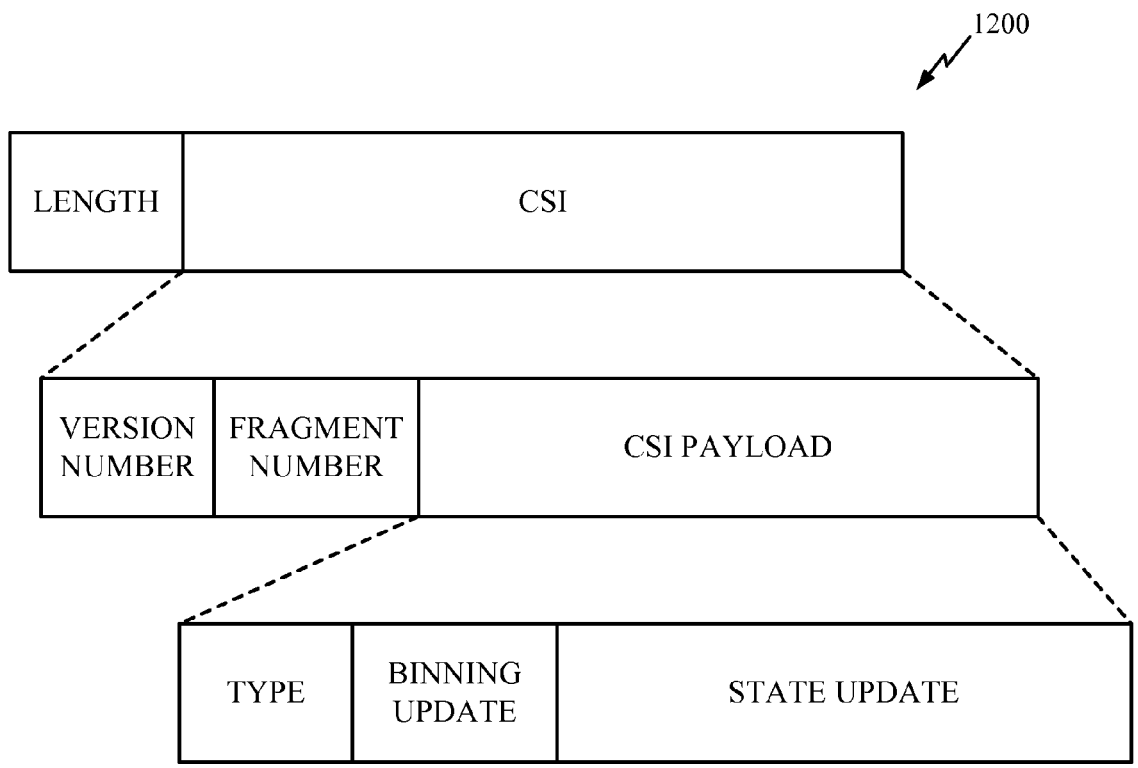
FIG. 12 shows an exemplary format of a CSI packet, according to one embodiment.
FIG. 13 is a table showing the number of feedback bits for the various fields of the exemplary CSI packet of FIG. 12.

The above-embodiments may be combined to and/or used in conjunction with each other. For example, beacons may be used for a full state update (e.g., providing CSI for all tones, without using binning) and one of enhanced B-ACK or piggybacking may be used for differential CSI and/or binning CSI on a best effort basis. One embodiment uses a single full state update at the initialization phase, followed by differential updates to track the channel variability (e.g., the change in the channel conditions for Tones 1 through N in the channel 118). The receiver may track the actual channel conditions versus the feedback reports. The receiver may initiate a full state update from time to time if the difference between the actual and the reported channel conditions exceeds a pre-specified threshold level. In another embodiment full state updates may also be provided on a periodic basis. The period being determined according to channel variability (e.g., how often the channel changes) of the channel 118. Some embodiments may need enhancements to the existing MAC functionalities to accommodate enhanced B-ACK and piggybacking FIG. 12 shows an exemplary format of a CSI packet 1200, according to one embodiment. The CSI packet 1200 may comprise a LENGTH field and a CSI field. The LENGTH field may comprise the total length of CSI packet 1200. The CSI field may comprise a VERSION NUMBER, a FRAGMENT NUMBER and a CSI PAYLOAD. The VERSION NUMBER may be used by the transmitter 110 and the receiver 114 to synchronize the CSI. For example, a first CSI packet may not be received by the transmitter 110. The receiver 114 may continue transmitting subsequent packets even though the first CSI packet was not received by the transmitter 110. The VERSION NUMBER may be used to help ensure the CSI packets are received in the corrected order and/or may be used to re-transmit CSI packets which were not received by the transmitter 110. In the embodiment where the CSI is split over multiple MAC packets, the FRAGMENT NUMBER may used to identify which fragment is in the CSI PAYLOAD. The CSI PAYLOAD may comprise a TYPE field, BINNING UPDATE field and STATE UPDATE field. The BINNING UPDATE field may be used to provide information related to the re-designation of Tones 1 through 16 into Bins 1 through 5, as shown in FIG. 9. The STATE UPDATE field may specify the current channel state. This embodiment may be combined with the above-described embodiments for sending CSI. For example CSI packet 1200 may be sent in an ASIE or piggybacked with B-ACK or other data over the channel 118 or the feedback channel 122 of the communication system 100.

As shown in FIG. 12, the feedback packet may comprise a variety of information as needed by the communication system 100 to dynamically allocate resources to channel 118. FIG. 12 merely describes one exemplary implementation. Embodiments of the invention are applicable to other implementations of feedback packets. In one embodiment, the transmitter 110 and the receiver 114 may be synchronized with respect to the CSI version (e.g., the VERSION NUMBER) as the transmitter 110 may indicate the CSI version used by using some reserved bits (e.g., bits that may be reserved for future use) in the header. In one embodiment, this CSI version may or may not be the latest CSI version the receiver sent to the transmitter. For example, the transmitter 110 may not have a current version of CSI if a previous CSI feedback packet was not received (e.g., lost in transit). Then the transmitter's last received CSI feedback packet will have an older version number. Thus, the transmitter 110 will know that it did not receive the previous CSI feedback packet by looking at the CSI version of the new CSI feedback packet.

CSI packet 1200 may be classified into at least four different types. In one embodiment, the four different types, which are indicated by the TYPE field as shown in FIG. 12, are:

TYPE "00": Differential state update only.
TYPE "01": Full state update only.
TYPE "10": Full state update with fixed size binning update.
TYPE "11": Full state update with variable size binning update.

The first type is a differential state update only, e.g., the CSI packet 1200 only has information for a differential state update. The second type is a full state update. The third and fourth types dynamic binning updates. If a dynamic binning process is used, it may be necessary to provide updates of the new bin designations for the Tones 1 through 16, as shown in FIG. 9. These new bin designations may be of two types depending on whether a fixed or variable sized binning process is used. Thus, the third type is a full state update with fix sized binning update and the fourth type is a full state update with variable sized binning update. In one embodiment, whenever binning CSI is generated by the receiver 114, it may be desirable to provide full CSI as well. In the embodiment where a static binning process is used by the receiver 114, binning CSI is not used. Thus, only the first two types of feedback packets will be used.

STATE UPDATE: This field contains updated CSI for all the spectral bins. The updates may be full state updates or differential state updates, depending on the TYPE field. When differential state updates with variable length codes are used, this field may be decoded in a sequential manner.

As shown in FIG. 12, the CSI packet 1200 also comprises a BINNING UPDATE field. In one embodiment, if a static binning process is used, this field is not required. In another embodiment, if a dynamic binning process is used, the BINNING UPDATE field may contain information about the changes in the bin designations. In yet another embodiment, if a fixed size binning process is used, the BINNING UPDATE field may comprise single bin size. In one embodiment, if a variable size binning process is used, this field may contain information about the total number of bins and/or the sequence of bin sizes.

FIG. 13 is a table 1300 showing the number of feedback bits for the various fields of the exemplary CSI packet 1200 of FIG. 12. Table 1300 shows the number of feedback bits for the BINNING UPDATE field, the STATE UPDATE field and the total length of the CSI PAYLOAD for the various types of the CSI packet 1200, as discussed above and shown in FIG. 12. For example, as shown in FIG. 13, the CSI packet 1200 for a differential update only uses 2 bits for the TYPE field, and 38 bits for the STATE UPDATE field, and a total of 40 bits used for the CSI PAYLOAD. The embodiment shown in FIG. 13 is merely shows an exemplary number of feedback bits for the various fields of the exemplary CSI packet 1200 of FIG. 12. In other embodiments, the CSI payload size (e.g., the number of bits for the TYPE, BINNING UPDATE, and STATE UPDATE) may be a value appropriate to the communication system 100.

In one embodiment, fixed size binning processes may be used with differential state updates. This embodiment may provide better feedback compression when compared with an embodiment using a variable size binning processes and full state updates.

In one embodiment, depending on the available padding area (e.g., extra bits used to "pad" a packet so that it is a certain length) in the current MAC packet, it may be desirable to divide the feedback payload into multiple fragments and send them in successive MAC packets. In one embodiment, it may be necessary to fragment the CSI payload and send the different fragments in successive MAC packet transmissions. This embodiment may use a fragmentation technique in which the CSI payload is split into two or more parts. The length of the first part is chosen such that the overall fragmented packet size equals the available MAC frame padding area. The FRAGMENT NUMBER field provides the index of the fragment, and is incremented in successive transmissions. In one embodiment, the FRAGMENT NUMBER may be resent when the CSI version changes. For example, when VERSION filed of CSI packets changes from 1 to 2, the FRAGMENT number may reset to 0. The second and other parts of the CSI payload may run through the same fragmentation procedure when the next MAC packet is constructed.

The CSI packet 1200 may be highly time-sensitive. Thus, in one embodiment, these packets are not be fragmented many times as this may delay the transmission of the CSI packet 1200 from the receiver 114 to the transmitter 110. New CSI packets, such as CSI packet 1200, may be generated based on recent channel estimates. If the new CSI packets vary from the previous ones, then the transmission of the fragments of previous CSI packet may be stopped and the new CSI packets may be transmitted instead. In another embodiment, the receiver 114 may transmit a fragmented full CSI packet or transmit a complete differential CSI packet. As discussed earlier, a full CSI packet may be sent after regular intervals. In one embodiment, a full CSI packet may be sent if the receiver 114 determines that the differential CSI packet will not provide accurate enough CSI to the transmitter 110. The receiver 114 may have a threshold level for the accuracy of the CSI.

The above-described methods may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above. In addition, the steps described in the above-referenced figures may be performed in a different order, may be performed simultaneously and certain of the steps may be omitted.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A wireless communication apparatus operable in a communication system, the wireless communication apparatus comprising:
   a channel estimator module configured to determine, via a processor, a variation in channel condition of at least one carrier frequency in a plurality of carrier frequencies designated for communicating the information, the variation being indicative of a channel condition for the at least one carrier frequency relative to at least one of a prior channel condition and a reference channel;
   a determination module configured to determine via a processor when a first criterion is satisfied, wherein the determination of when the first criterion is satisfied is based on, at least in part, comparing the variation in channel condition to a channel state model representative of channel state transition probabilities; and
   a communication module configured to communicate via a processor from a receiver to a transmitter data indicative of the variation in channel condition for the at least one carrier frequency when the determination module determines that the variation in channel condition satisfies the first criterion based on, at least in part, the comparison of the variation in channel condition to the channel state model representative of channel state transition probabilities.

2. The apparatus of claim 1, wherein the determination of whether the first criterion is satisfied is further based on, at least in part, whether the variation in channel condition corresponds to a channel state transition probability greater than a threshold.

3. The apparatus of claim 1, wherein the determination of whether the first criterion is satisfied is further based on, at least in part, if a degree of variation in channel condition for the at least one carrier frequency exceeds a threshold.

4. The apparatus of claim 1, wherein a number of bits representing the variation in channel condition for a carrier frequency depends at least in part on a degree of variation in channel condition for the carrier frequency.

5. The apparatus of claim 1, further comprising an adjusting module configured to adjust a channel characteristic of at least one carrier frequency in the plurality of carrier frequencies using a combination of adjacent and non-adjacent step adjustments between adjacent performance levels.

6. The apparatus of claim 1, wherein the channel estimator module is further configured to determine the reference channel condition for each carrier frequency of the plurality of carrier frequencies.

7. The apparatus of claim 6, wherein the communication module is further configured to communicate the reference channel condition for the plurality of carrier frequencies at a periodic interval that is longer than a periodic interval associated with communicating the variation in channel condition.

8. The apparatus of claim 1, wherein the channel condition comprises at least one of a data rate, a throughput, a noise level, an SNR level, a power level, and a channel quality indicator.

9. The apparatus of claim 1, further comprising a grouping module configured to group the plurality of carrier frequencies into at least a first group of carrier frequencies and a second group of carrier frequencies.

10. The apparatus of claim 9, wherein:
the channel estimator module is further configured to determine via a processor a combined variation in channel condition for at least one of the first group of carrier frequencies and the second group of carrier frequencies, the combined variation being indicative of a combined channel condition for carrier frequencies in at least one of the first group of carrier frequencies and the second group of carrier frequencies relative to at least one of a prior combined channel condition and a reference combined channel condition; and
the communication module is further configured to communicate from the receiver to the transmitter, the combined variation in channel condition for at least one of the first group of carrier frequencies and the second group of carrier frequencies if the combined variation in channel condition satisfies all the first criterion.

11. The apparatus of claim 10, wherein the determination module is further configured to determine if the first criterion is satisfied with respect to the combined variation.

12. The apparatus of claim 11, wherein the determination of whether the first criterion is satisfied with respect to the combined variation is based on, at least in part, comparing the combined variation in channel condition to a channel state model representative of channel state transition probabilities.

13. The apparatus of claim 12, wherein the determination of whether the first criterion is satisfied with respect to the combined variation is further based on, at least in part, whether the combined variation in channel condition corresponds to a channel state transition probability greater than a threshold.

14. The apparatus of claim 12, wherein the determination of whether the first criterion is satisfied with respect to the combined variation is further based on, at least in part, if a degree of combined variation in channel condition for the at least one carrier frequency exceeds a threshold.

15. A wireless communication apparatus operable in a communication system, the wireless communication apparatus comprising:
means for determining a variation in channel condition of at least one carrier frequency in a plurality of carrier frequencies designated for communicating the information, the variation being indicative of a channel condition for the at least one carrier frequency relative to at least one of a prior channel condition and a reference channel;
means for determining when a first criterion is satisfied, wherein the determination of when the first criterion is satisfied is based on, at least in part, comparing the variation in channel condition to a channel state model representative of channel state transition probabilities; and
means for communicating from a receiver to a transmitter data indicative of the variation in channel condition for the at least one carrier frequency when the determining means determines that the variation in channel condition satisfies the first criterion based on, at least in part, the comparison of the variation in channel condition to the channel state model representative of channel state transition probabilities.

16. The apparatus of claim 15, wherein the determination of whether the first criterion is satisfied is further based on, at least in part, whether the variation in channel condition corresponds to a channel state transition probability greater than a threshold.

17. The apparatus of claim 15, wherein the determination of whether the first criterion is satisfied is further based on, at least in part, if a degree of variation in channel condition for the at least one carrier frequency exceeds a threshold.

18. The apparatus of claim 15, wherein a number of bits representing the variation in channel condition for a carrier frequency depends at least in part on a degree of variation in channel condition for the carrier frequency.

19. The apparatus of claim 15, further comprising means for adjusting a channel characteristic of at least one carrier frequency in the plurality of carrier frequencies using a combination of adjacent and non-adjacent step adjustments between adjacent performance levels.

20. The apparatus of claim 15, wherein the means for determining a variation is further configured to determine the reference channel condition for each carrier frequency of the plurality of carrier frequencies.

21. The apparatus of claim 20, wherein the means for communicating is further configured to communicate the reference channel condition for the plurality of carrier frequencies at a periodic interval that is longer than a periodic interval associated with communicating the variation in channel condition.

22. The apparatus of claim 15, wherein the channel condition comprises at least one of a data rate, a throughput, a noise level, an SNR level, a power level, and a channel quality indicator.

23. The apparatus of claim 15, further comprising means for grouping the plurality of carrier frequencies into at least a first group of carrier frequencies and a second group of carrier frequencies.

24. The apparatus of claim 23, wherein:
the means for determining a variation is further configured to determine a combined variation in channel condition for at least one of the first group of carrier frequencies and the second group of carrier frequencies, the combined variation being indicative of a combined channel condition for carrier frequencies in at least one of the first group of carrier frequencies and the second group of carrier frequencies relative to at least one of a prior combined channel condition and a reference combined channel condition; and the means for communicating is further configured to communicate from the receiver to the transmitter, the combined variation in channel condition for at least one of the first group of carrier frequencies and the second group of carrier frequencies if the combined variation in channel condition satisfies the first criterion.

25. The apparatus of claim 24, further comprising means for determining if the first criterion is satisfied with respect to the combined variation.

26. The apparatus of claim 25, wherein the determination of whether the first criterion is satisfied with respect to the combined variation is based on, at least in part, comparing the combined variation in channel condition to a channel state model representative of channel state transition probabilities.

27. The apparatus of claim 26, wherein the determination of whether the first criterion is satisfied with respect to the combined variation is further based on, at least in part, whether the combined variation in channel condition corresponds to a channel state transition probability greater than a threshold.

28. The apparatus of claim 26 wherein the determination of whether the first criterion is satisfied with respect to the combined variation is further based on, at least in part, if a degree of combined variation in channel condition for the at least one carrier frequency exceeds a threshold.

29. A method of communicating in a communication system, the method comprising:
    determining a variation in channel condition of at least one carrier frequency in a plurality of carrier frequencies designated for communicating the information, the variation being indicative of a channel condition for the at least one carrier frequency relative to at least one of a prior channel condition and a reference channel;
    determining when a first criterion is satisfied, wherein the determination of when the first criterion is satisfied is based on, at least in part, comparing the variation in channel condition to a channel state model representative of channel state transition probabilities; and
    communicating from a receiver to a transmitter data indicative of the variation in channel condition for the at least one carrier frequency when the determination module determines that the variation in channel condition satisfies the first criterion based on, at least in part, the comparison of the variation in channel condition to the channel state model representative of channel state transition probabilities.

30. The method of claim 29, wherein the determination of whether the first criterion is satisfied is further based on, at least in part, whether the variation in channel condition corresponds to a channel state transition probability greater than a threshold.

31. The method of claim 29, wherein the determination of whether the first criterion is satisfied is further based on, at least in part, if a degree of variation in channel condition for the at least one carrier frequency exceeds a threshold.

32. The method of claim 29, wherein a number of bits representing the variation in channel condition for a carrier frequency depends at least in part on a degree of variation in channel condition for the carrier frequency.

33. The method of claim 29, further comprising adjusting a channel characteristic of at least one carrier frequency in the plurality of carrier frequencies using a combination of adjacent and non-adjacent step adjustments between adjacent performance levels.

34. The method of claim 29, further comprising determining the reference channel condition for each carrier frequency of the plurality of carrier frequencies.

35. The method of claim 34, further comprising communicating the reference channel condition for the plurality of carrier frequencies at a periodic interval that is longer than a periodic interval associated with communicating the variation in channel condition.

36. The method of claim 29, wherein the channel condition comprises at least one of a data rate, a throughput, a noise level, an SNR level, a power level, and a channel quality indicator.

37. The method of claim 29, further comprising grouping the plurality of carrier frequencies into at least a first group of carrier frequencies and a second group of carrier frequencies.

38. The method of claim 37, further comprising:
    determining a combined variation in channel condition for at least one of the first group of carrier frequencies and the second group of carrier frequencies, the combined variation being indicative of a combined channel condition for carrier frequencies in at least one of the first group of carrier frequencies and the second group of carrier frequencies relative to at least one of a prior combined channel condition and a reference combined channel condition; and
    communicating from the receiver to the transmitter, the combined variation in channel condition for at least one of the first group of carrier frequencies and the second group of carrier frequencies if the combined variation in channel condition satisfies the first criterion.

39. The method of claim 38, further comprising determining if the first criterion is satisfied with respect to the combined variation.

40. The method of claim 39, wherein the determination of whether the first criterion is satisfied with respect to the combined variation is based on, at least in part, comparing the combined variation in channel condition to a channel state model representative of channel state transition probabilities.

41. The method of claim 40, wherein the determination of whether the first criterion is satisfied with respect to the combined variation is further based on, at least in part, whether the combined variation in channel condition corresponds to a channel state transition probability greater than a threshold.

42. The method of claim 40 wherein the determination of whether the first criterion is satisfied with respect to the combined variation is further based on, at least in part, if a degree of combined variation in channel condition for the at least one carrier frequency exceeds a threshold.

43. A computer program product, comprising:
    non-transitory computer-readable medium comprising:
        code for causing a computer to determine a variation in channel condition of at least one carrier frequency in a plurality of carrier frequencies designated for communicating the information, the variation being indicative of a channel condition for the at least one carrier frequency relative to at least one of a prior channel condition and a reference channel;
        code for causing a computer to determine when a first criterion is satisfied, wherein the determination of when the first criterion is satisfied is based on, at least in part, comparing the variation in channel condition to a channel state model representative of channel state transition probabilities; and code for causing a computer to communicate from a receiver to a transmitter data indicative of the variation in channel condition for the at least one carrier frequency when the determination module determines that the variation in channel condition satisfies the first criterion based on, at least in part, the comparison of the variation in channel condition to the channel state model representative of channel state transition probabilities.

44. The non-transitory computer-readable medium of claim 43, wherein the determination of whether the first criterion is satisfied is further based on, at least in part, whether the variation in channel condition corresponds to a channel state transition probability greater than a threshold.

45. The non-transitory computer-readable medium of claim 43, wherein the determination of whether the first criterion is satisfied is further based on, at least in part, if a degree of variation in channel condition for the at least one carrier frequency exceeds a threshold.

46. The computer-readable medium of claim 43, wherein a number of bits representing the variation in channel condition for a carrier frequency depends at least in part on a degree of variation in channel condition for the carrier frequency.

47. The non-transitory computer-readable medium of claim 43, further comprising code for causing a computer to adjust a channel characteristic of at least one carrier frequency in the plurality of carrier frequencies using a combination of adjacent and non-adjacent step adjustments between adjacent performance levels.

48. The non-transitory computer-readable medium of claim 43, further comprising code for causing a computer to determine the reference channel condition for each carrier frequency of the plurality of carrier frequencies.

49. The non-transitory computer-readable medium of claim 48, further comprising code for causing a computer to communicate the reference channel condition for the plurality of carrier frequencies at a periodic interval that is longer than a periodic interval associated with communicating the variation in channel condition.

50. The non-transitory computer-readable medium of claim 43, wherein the channel condition comprises at least one of a data rate, a throughput, a noise level, an SNR level, a power level, and a channel quality indicator.

51. The non-transitory computer-readable medium of claim 43, further comprising code for causing a computer to group the plurality of carrier frequencies into at least a first group of carrier frequencies and a second group of carrier frequencies.

52. The non-transitory computer-readable medium of claim 51, further comprising:
code for causing a computer to determine a combined variation in channel condition for at least one of the first group of carrier frequencies and the second group of carrier frequencies, the combined variation being indicative of a combined channel condition for carrier frequencies in at least one of the first group of carrier frequencies and the second group of carrier frequencies relative to at least one of a prior combined channel condition and a reference combined channel condition; and
code for causing a computer to communicate from the receiver to the transmitter, the combined variation in channel condition for at least one of the first group of carrier frequencies and the second group of carrier frequencies if the combined variation in channel condition satisfies the first criterion.

53. The non-transitory computer-readable medium of claim 52, further comprising code for causing a computer to determine if the first criterion is satisfied with respect to the combined variation.

54. The non-transitory computer-readable medium of claim 53, wherein the determination of whether the first criterion is satisfied with respect to the combined variation is based on, at least in part, comparing the combined variation in channel condition to a channel state model representative of channel state transition probabilities.

55. The non-transitory computer-readable medium of claim 54, wherein the determination of whether the first criterion is satisfied with respect to the combined variation is further based on, at least in part, whether the combined variation in channel condition corresponds to a channel state transition probability greater than a threshold.

56. The non-transitory computer-readable medium of claim 54, wherein the determination of whether the first criterion is satisfied with respect to the combined variation is further based on, at least in part, if a degree of combined variation in channel condition for the at least one carrier frequency exceeds a threshold.

* * * * *